(12) United States Patent
Karp

(10) Patent No.: US 12,194,509 B2
(45) Date of Patent: Jan. 14, 2025

(54) SYSTEM AND METHOD FOR CLEANING A LASER CUT SUBSTRATE

(71) Applicant: HIGHCON SYSTEMS LTD., Yavne (IL)

(72) Inventor: Michael Karp, Rosh Ha-Ayin (IL)

(73) Assignee: HIGHCON SYSTEMS LTD., Yavne (IL)

( * ) Notice: Subject to any disclaimer, the term of this patent is extended or adjusted under 35 U.S.C. 154(b) by 363 days.

(21) Appl. No.: 17/285,343

(22) PCT Filed: Nov. 4, 2019

(86) PCT No.: PCT/IB2019/059432
§ 371 (c)(1),
(2) Date: Apr. 14, 2021

(87) PCT Pub. No.: WO2020/095167
PCT Pub. Date: May 14, 2020

(65) Prior Publication Data
US 2021/0370355 A1 Dec. 2, 2021

(30) Foreign Application Priority Data

Nov. 9, 2018 (GB) ...................................... 1818265

(51) Int. Cl.
*B08B 1/20* (2024.01)
*B08B 1/10* (2024.01)
(Continued)

(52) U.S. Cl.
CPC ................. *B08B 1/20* (2024.01); *B08B 1/10* (2024.01); *B08B 1/50* (2024.01); *B08B 11/02* (2013.01); *B23K 26/38* (2013.01)

(58) Field of Classification Search
None
See application file for complete search history.

(56) References Cited

U.S. PATENT DOCUMENTS

| | | |
|---|---|---|
| 3,654,654 A | 4/1972 | Abreu et al. |
| 3,781,107 A | 12/1973 | Ruhland |
| 2009/0274979 A1 | 11/2009 | Teng |

FOREIGN PATENT DOCUMENTS

| | | |
|---|---|---|
| EP | 1 150 178 B1 | 11/2004 |
| JP | 4-271881 A | 9/1992 |

(Continued)

OTHER PUBLICATIONS

SIF Felt and Custom Felt Product Sheet, FXI, Inc. Copyright 2017, www.fxi.com (Year: 2017).*

(Continued)

*Primary Examiner* — Rita P Adhlakha
(74) *Attorney, Agent, or Firm* — Sughrue Mion, PLLC

(57) ABSTRACT

A system for cleaning a surface of a substrate includes a cleaning element including a resilient compressible material. A liquid source provides liquid directly to the cleaning element, and a squeezing roller engages the cleaning element and applies pressure thereto, to squeeze out excess liquid from said resilient compressible material. A counter element opposes said cleaning element such that the substrate is disposed between the counter element and the cleaning element. The substrate moves between the counter element and the cleaning element such that a surface of the cleaning element, having a suitable amount of liquid absorbed therein, engages and cleans the surface of the substrate without damaging the substrate.

24 Claims, 14 Drawing Sheets

(51) Int. Cl.
  *B08B 1/50*   (2024.01)
  *B08B 11/02*  (2006.01)
  *B23K 26/38*  (2014.01)

(56) References Cited

FOREIGN PATENT DOCUMENTS

| | | |
|---|---|---|
| JP | 2002-126660 A | 5/2002 |
| JP | 2004-187816 A | 7/2004 |
| JP | 2013-86127 A | 5/2013 |
| JP | 2013-191812 A | 9/2013 |
| JP | 2017-87183 A | 5/2017 |
| KR | 10-0845734 B1 | 7/2008 |
| SU | 706 139 A1 | 12/1979 |
| WO | 2011/076633 A1 | 6/2011 |

OTHER PUBLICATIONS

International Search Report of PCT/IB2019/059432 dated Jan. 29, 2020 [PCT/ISA/210].
Written Opinion of PCT/IB2019/059432 dated Jan. 29, 2020 [PCT/ISA/237].
Extended European Search Report dated Jul. 15, 2022 in European Application No. 19882772.7.

* cited by examiner

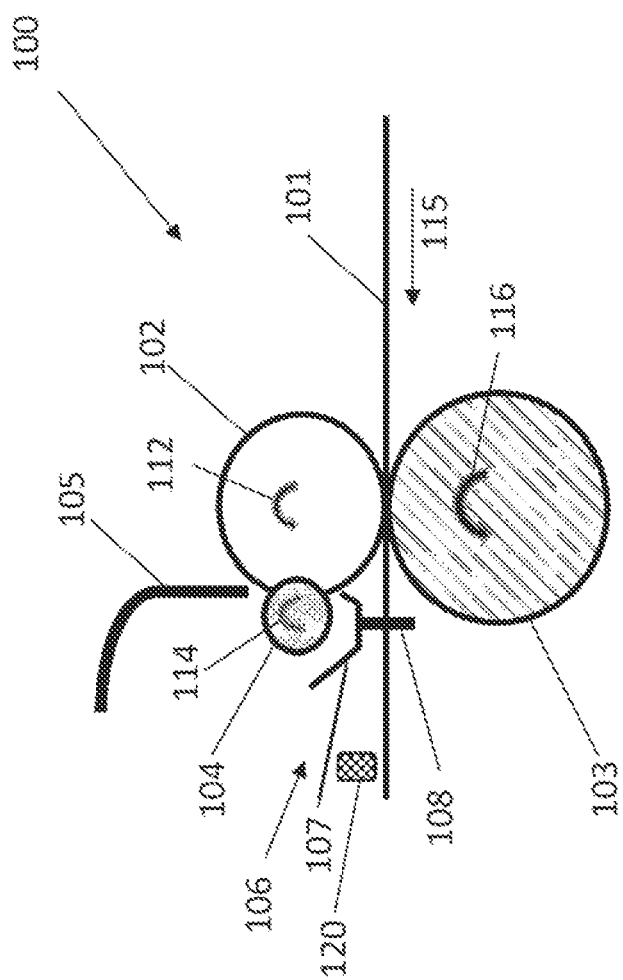

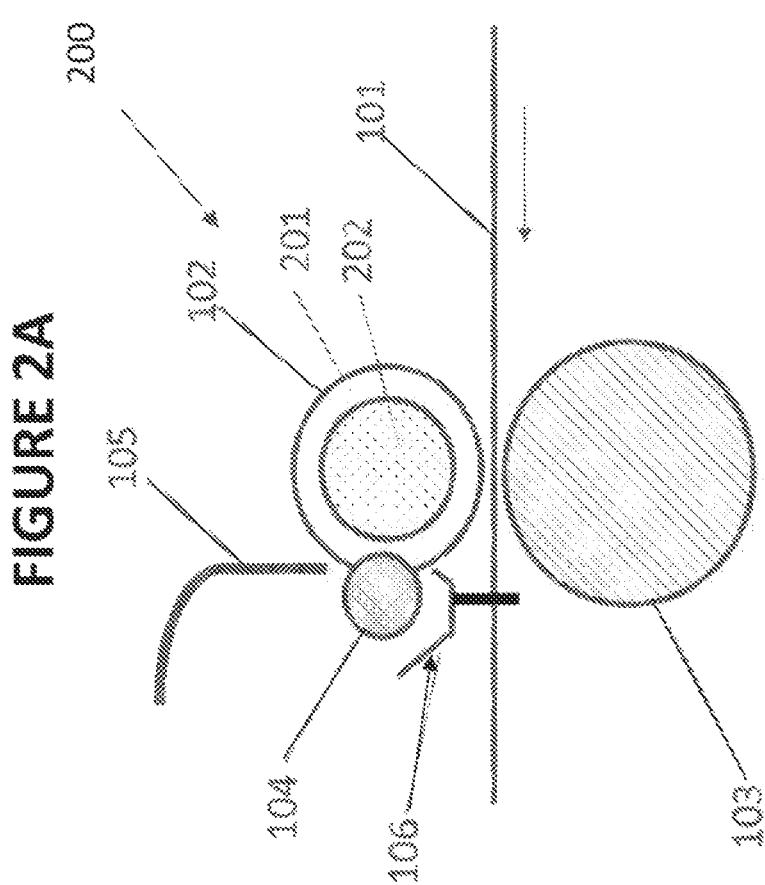

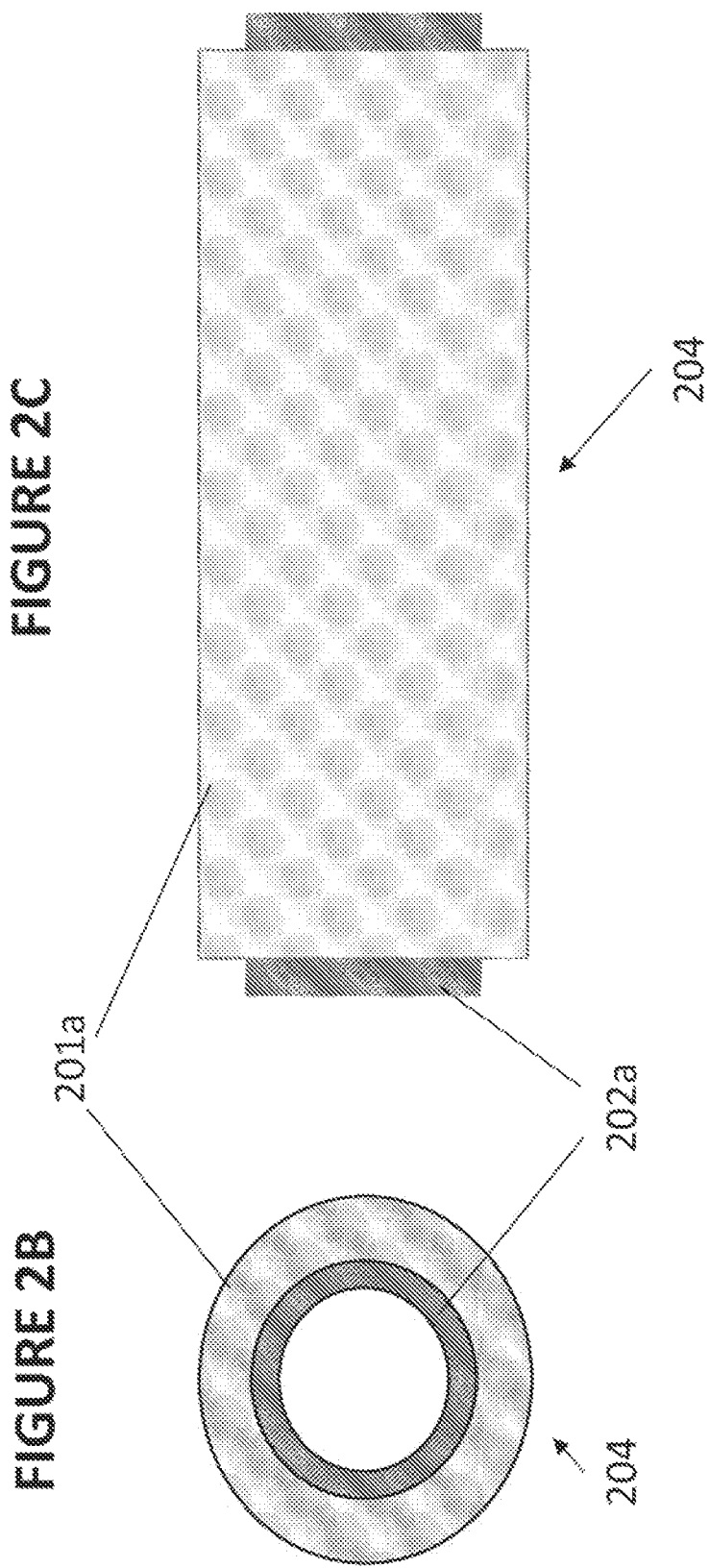

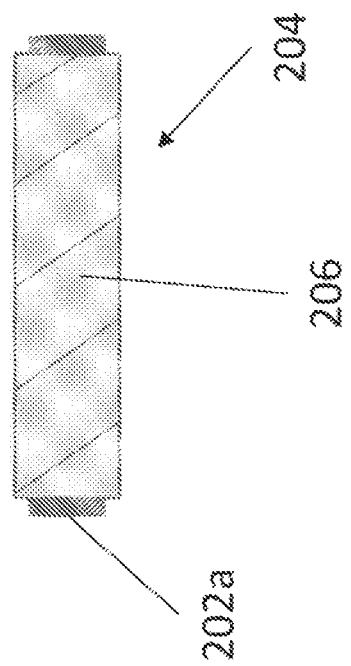
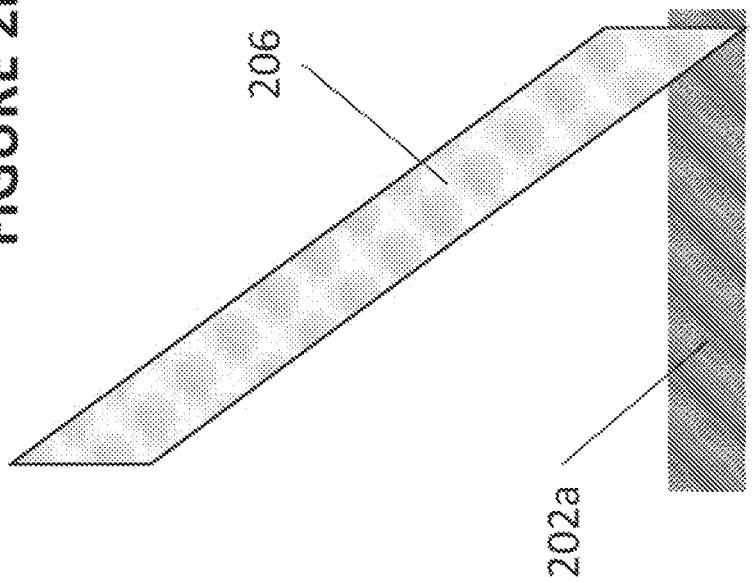

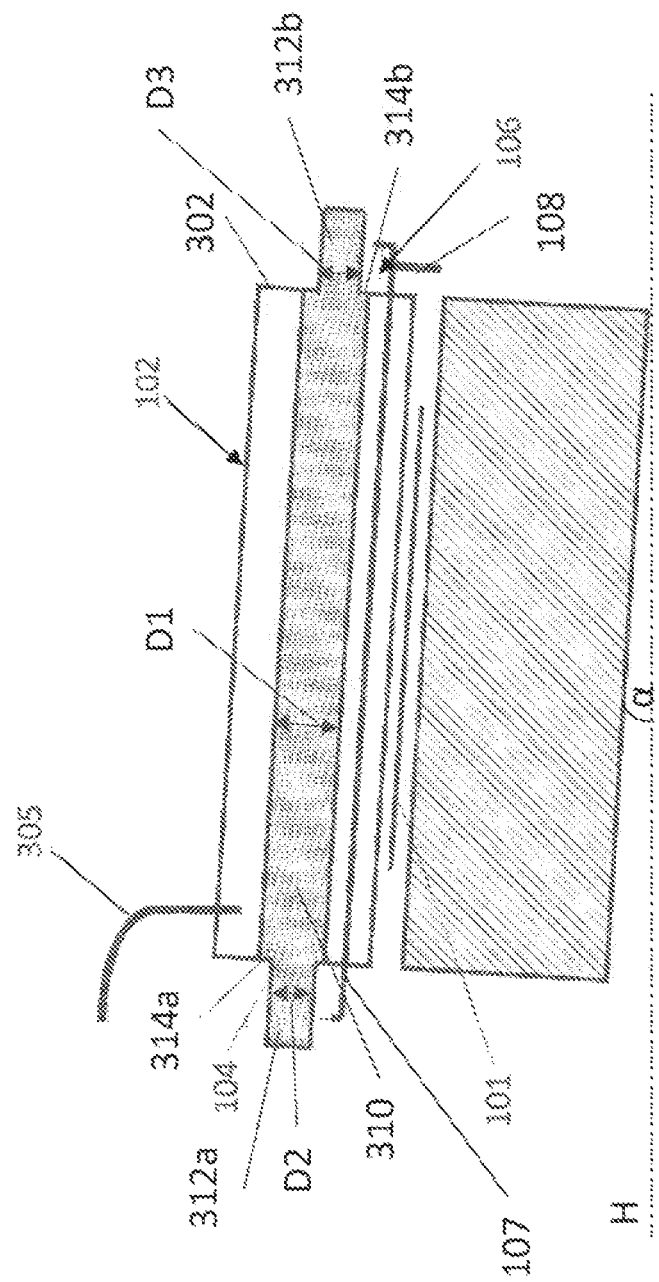

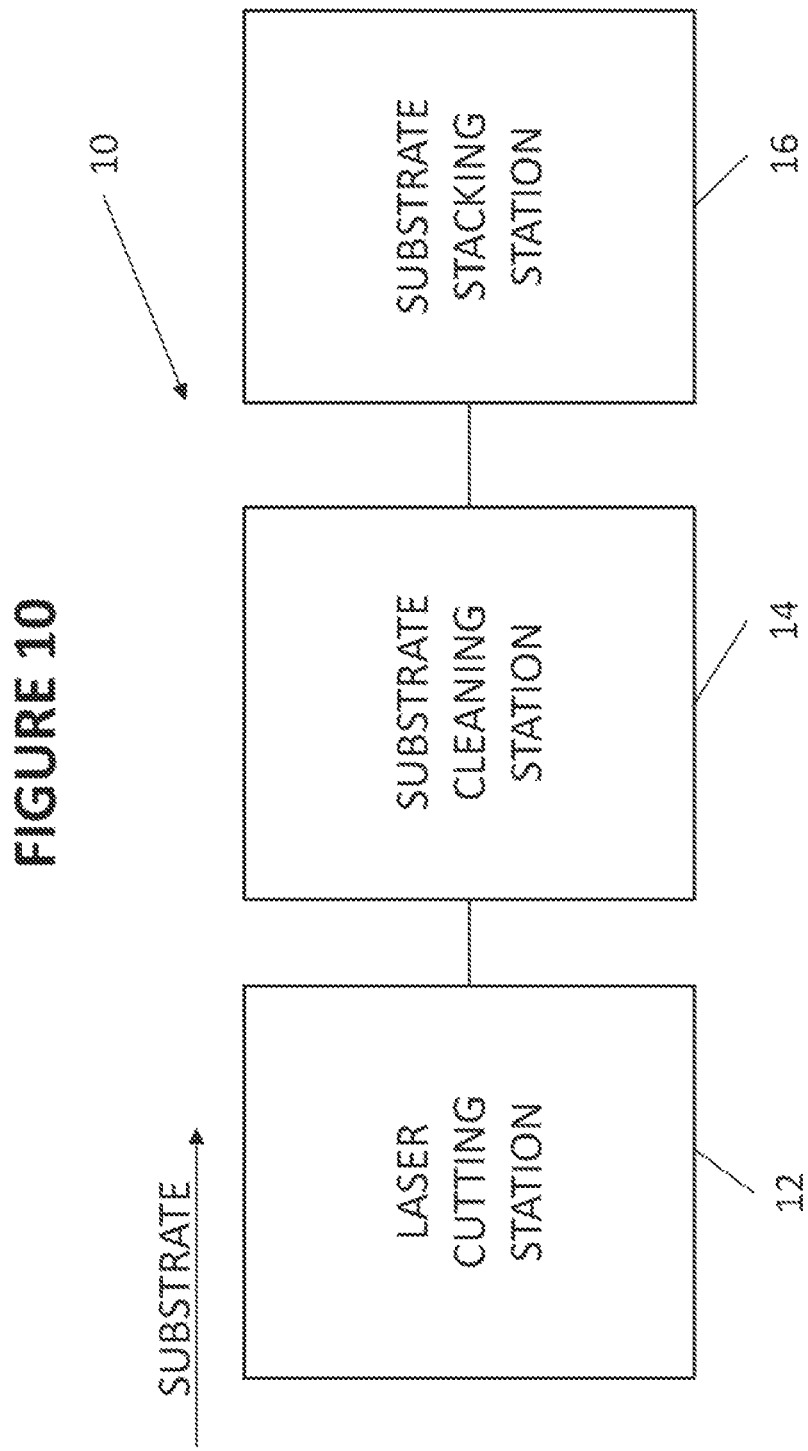

SYSTEM AND METHOD FOR CLEANING A LASER CUT SUBSTRATE

RELATED APPLICATION

This application is a National Stage of International Application No. PCT/IB2019/059432 filed on Nov. 4, 2019, claiming priority based on GB Patent Application Number GB1818265.9 filed Nov. 9, 2018 and entitled SYSTEM AND METHOD FOR CLEANING A LASER CUT SUBSTRATE, which applications are incorporated herein by reference as if fully set forth herein.

FIELD OF THE INVENTION

The present invention relates to systems and methods for improving laser cut paper substrates, and, more particularly, to systems and methods which clean a laser cut paper substrate following cutting thereof, to remove or mitigate burn marks or residue therefrom.

BACKGROUND OF THE INVENTION

Systems and methods for laser cutting of paper are well known in the art, and are commercially available. For example, Packmaster CW and LabelMaster are commercially available from SEI laser of Curno, Italy, and Highcon Euclid is commercially available from Highcon Systems LTD of Yavne, Israel.

The laser cutting process of paper, as with most wood-based materials, is a thermochemical decomposition process. Specifically, laser cutting of paper is considered to be a vaporization cutting process. When the laser beam reaches the surface of the work piece, the laser beam heats up the material to its evaporation temperature, thereby causing the paper material to sublimate.

As a result of the decomposition of the paper, the decomposition products, such as debris and fumes, are carried away from the high temperature cutting area, and set around, or near, the cut area, thus dirtying or contaminating the cut area, which detracts from the aesthetic appearance of the cut paper. This phenomenon is known by many terms, including "laser burn marks", "Heat Affected Zones (HAZ)", "cutting ablation residue", and "laser cut residue". Such laser cut residue is particularly evident on glossy or shiny paper, and/or on coated, printed, or laminated paper, as the residue provides a matte appearance of the paper adjacent the cutting lines.

Optimization of the laser parameters and/or aeration conditions during the cutting process have some influence on the level of contamination of the cut area by residue, but do not enable complete elimination of this effect. Known methods for cleaning the surface of the paper substrate include adhering a protective layer to the surface of the substrate prior to cutting and removing the protective layer following the cutting process, and manually wiping the paper substrate clean with a tissue slightly wetted in IPA or water, following cutting thereof.

The inventors have recognized a need for further improvements in post-cutting cleaning of the surface of paper substrate surfaces, while maintaining or substantially maintaining paper integrity.

SUMMARY OF THE INVENTION

In accordance with an embodiment of the present invention, there is provided a system for cleaning a surface of a substrate, without damaging the substrate, the system including:

a cleaning element, including at least an outer layer formed of a resilient compressible material;

a liquid source adapted to provide liquid directly to the cleaning element;

at least one squeezing roller, engaging the cleaning element and applying pressure at least to the outer layer; and a counter element, adapted at least to counter the cleaning element, such that the substrate can be substantially stably disposed between the cleaning element and the counter element, wherein, in an operative mode of the system, the substrate is disposed between the counter element and the cleaning element such that a first broad surface of the substrate engages the cleaning element and a second broad surface of the substrate engages the counter element, wherein, in the operative mode, the cleaning element is adapted to rotate in a first direction while liquid is provided thereto by the liquid source, such that at least some of the provided liquid is absorbed in the resilient compressible material, wherein, in the operative mode, the squeezing roller is adapted to rotate about a longitudinal axis thereof in a second direction, opposed to the first direction, so as to apply pressure to the resilient compressible material of the cleaning element and to remove at least part of the absorbed liquid from the resilient compressible material, and wherein, in the operative mode, while the substrate is driven between the cleaning element and the counter element and a surface of the resilient compressible material engages the first broad surface of the substrate, the first broad surface of the substrate is cleaned by the resilient compressible material.

In some embodiments, the flexible resilient material includes a foam material. In some such embodiments, the foam material is selected from the group consisting of open rubber foam, reticulated foam, and felted foam.

In some embodiments, the resilient compressible material has a density in the range of 0.1 g/cm3 to 0.4 g/cm3, or 0.15 g/cm3 to 0.30 g/cm3.

In some embodiments, the resilient compressible material has a 65% compression pressure in the range of 15 psi to 80 psi, 20 psi to 75 psi, or 25 psi to 70 psi.

In some embodiments, the counter element is adapted to rotate and to drive motion of the substrate through the system. In some such embodiments, the counter element is adapted to rotate and to drive motion the substrate in the first direction.

In some embodiments, the liquid is a hydrophilic liquid. In some such embodiments, the hydrophilic liquid is water.

In some embodiments, the at least one squeezing roller is formed of a material selected from the group consisting of aluminum, stainless steel, and plastic.

In some embodiments, in the operative mode, the at least one squeezing roller is adapted to continuously apply pressure to the resilient compressible material of the cleaning element.

In some embodiments, in the operative mode, the at least one squeezing roller is adapted to periodically apply pressure to the resilient compressible material of the cleaning element.

In some embodiments, during rotation thereof against the cleaning element, the at least one squeezing roller is adapted to compress the resilient compressible material of the cleaning element by 5% to 75%, by 30% to 75%, or by 65% of a thickness of the resilient compressible material.

In some embodiments, the cleaning element includes an endless cleaning belt adapted to be moved and rotated by at least two rollers, and, in the operative mode, to engage the substrate and the counter element adjacent one of the at least two rollers.

In some embodiments, the outer layer of the cleaning belt is disposed onto a support layer and the support layer is formed a material selected from the group of textile, rubber, and metal.

In some embodiments, the counter element includes an endless counter belt adapted to be moved and rotated by at least two rollers, and, in the operative mode, to engage the substrate and the cleaning element between the at least two rollers.

In some embodiments, the liquid source includes a liquid reservoir and a pipe in fluid communication with the liquid reservoir, the pipe terminating in an outlet disposed adjacent the cleaning element, and wherein in the operative mode the outlet is adapted to provide the liquid to the cleaning element.

In some other embodiments, the liquid source includes a faucet having an outlet disposed adjacent the cleaning element, and wherein in the operative mode the faucet is adapted to provide the liquid to the cleaning element.

In some embodiments, an engagement point between the at least one squeezing roller and the cleaning element is disposed downstream, in the first direction, from the outlet of the liquid source, such that the at least one squeezing roller engages the cleaning element and removes the at least part of the absorbed liquid following provision of the liquid to the cleaning element and absorption of the liquid by the resilient compressible material.

In some embodiments, the liquid source includes a liquid bath containing the liquid, disposed beneath the cleaning element such that a portion of the resilient flexible material is disposed within the liquid bath, and wherein in the operative mode, with the cleaning element rotating in the first direction, different portions of the cleaning element pass through the liquid bath so as to provide the liquid thereto.

In some embodiments, the system further includes a liquid collector, including a liquid collection bath and a liquid drain, the liquid collector being disposed adjacent the cleaning element and downstream of an engagement point between the at least one squeezing roller and the cleaning element in the first direction, the liquid collector adapted, in the operative mode, to collect liquid removed from the cleaning element by the at least one squeezing roller and to drain the collected liquid from the system.

In some such embodiments, the liquid removed from the cleaning element by the at least one squeezing roller includes liquid that has been dirtied by cleaning the substrate at an earlier pass thereover.

In some embodiments, in the operative mode, the portion of the cleaning element engaging the substrate is sufficiently clean so as not to spread dirt on the substrate.

In some embodiments, the cleaning element includes a cleaning roller, and wherein a longitudinal axis of the cleaning roller and a longitudinal axis of the at least one squeezing roller are disposed at an angle relative to the horizontal, a nozzle of the liquid source provides the liquid to the cleaning element at or near a highest point of the cleaning element, the liquid collection bath extends along the longitudinal axis of the squeezing roller beneath the at least one squeezing roller and at the angle relative to the horizontal, and the liquid drain is disposed at a lowest point of the liquid collection bath, such that the liquid spreads along the length of the cleaning element, and collected liquid arrives at the liquid drain, under the force of gravity.

In some embodiments, the cleaning element includes a cleaning roller, and wherein a longitudinal axis of the cleaning roller and a longitudinal axis of the at least one squeezing roller are disposed horizontally, a nozzle of the liquid source provides the liquid to the cleaning element at or near a center point of the longitudinal axis of the cleaning element, the liquid collection bath extends horizontally along the longitudinal axis of the at least one squeezing roller beneath the at least one squeezing roller, and the liquid drain is disposed at a longitudinal end point of the liquid collection bath adjacent one longitudinal end of the cleaning roller, such that the liquid spreads along the length of the cleaning element by a force of the liquid stream provided from the nozzle.

In some embodiments, the substrate includes at least one substrate selected from the group of paper, paperboard, cardboard, laminated paper, embossed paper, paper having creasing lines and paper coated by a metallic layer.

In some embodiments, the system further includes a drying mechanism, disposed downstream along the counter element and of the cleaning element, and wherein, in the operative mode, the drying mechanism is adapted to dry the substrate following cleaning thereof by the cleaning element.

In accordance with some embodiments of the present invention, there is provided a system for creating a laser cut substrate, the system including:
  a laser cutting station, adapted, in an operative mode of the system, to direct a infrared laser at a first broad surface of a substrate so as to form at least one cut in the substrate; and
  a cleaning station including a cleaning system as described hereinabove, disposed downstream of the laser cutting station, and adapted, in the operative mode, to receive the substrate including the at least one cut and to engage the first broad surface of the substrate so as to clean the first broad surface.

In accordance with additional embodiments of the present invention, there is provided a method for cleaning a first broad surface of a substrate, the substrate having first and second broad surfaces, without damaging the substrate, using the system of the present invention described hereinabove, the method including:
  providing liquid to the cleaning element such that at least some of the provided liquid is absorbed in the resilient compressible material;
  rotating the cleaning element a first direction;
  during the rotating of the cleaning element, applying to the resilient compressible material of the cleaning element by rotating the squeezing roller about a longitudinal axis thereof in a second direction, opposed to the first direction, so as to remove at least part of the absorbed liquid from the resilient compressible material; and
  driving the substrate between the cleaning element and the counter element, such that a surface of the resilient compressible material engages the first broad surface of the substrate, so as to clean the first broad surface of the substrate.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIGS. 1A and 1B are schematic sectional illustrations of a first embodiment of an inventive system for cleaning HAZ from a paper substrate, according to an embodiment of the teachings herein, in a resting mode and in an operative mode, respectively;

FIG. 2A is a schematic sectional illustration of a second embodiment of an inventive system for cleaning HAZ from a paper substrate, according to another embodiment of the teachings herein;

FIGS. 2B and 2C are, respectively, front and side view planar illustrations of an embodiment of a cleaning roller forming part of the system of FIG. 2A; and FIGS. 2D and 2E are schematic illustrations of steps in forming the cleaning roller of FIGS. 2B and 2C;

FIG. 3 is a schematic side view illustration of a first arrangement of the system of FIGS. 1A and 1B, which facilitates refreshment of a cleaning liquid in the system;

FIG. 10 is a schematic block diagram of a laser cutting system including the inventive system of any one of FIGS. 1A to 9.

DESCRIPTION OF THE PREFERRED EMBODIMENTS

Figure 1A:
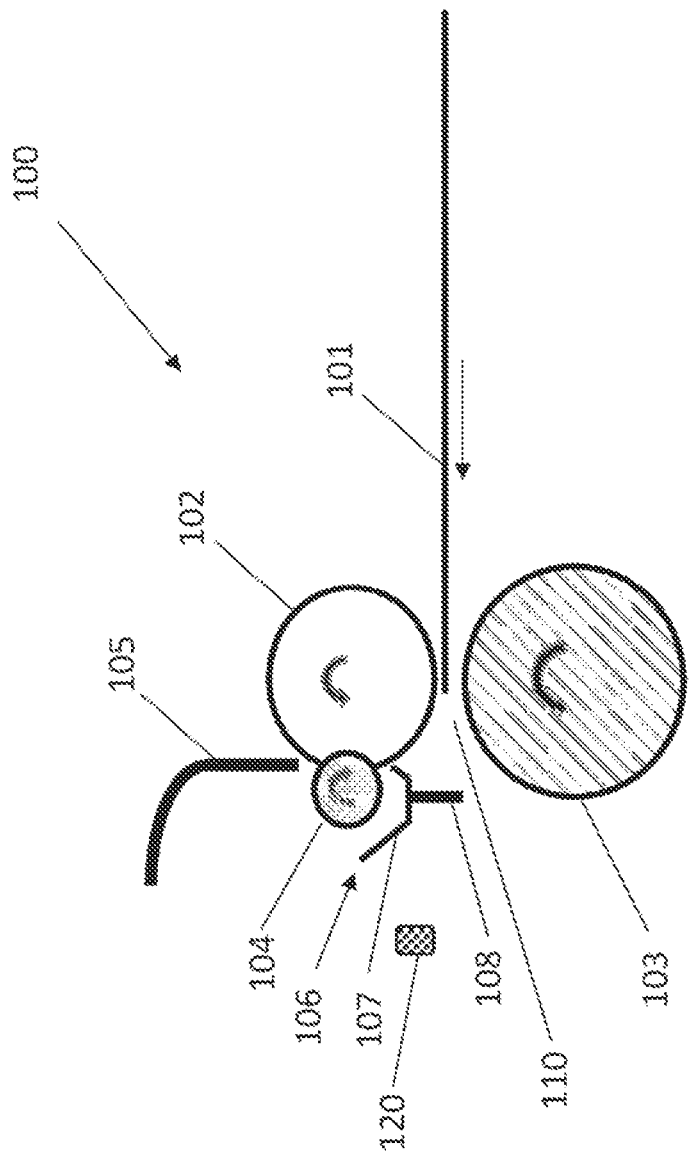

The present invention relates to systems and methods for improving laser cut paper substrates, and, more particularly, to systems and methods which clean a laser cut paper substrate following cutting thereof, to remove or mitigate burn marks or residue therefrom.

In the context of the present specification and claims, the terms "substrate" and "paper substrate" are used interchangeably, and relate to any substrate which is, or includes, at least one of paper, paperboard, cardboard, laminated paper, embossed paper, paper with creasing lines, paper coated by a metallic layer, or any other multilayer substrate in which at least one of the layers is a paper layer. The substrate may have a thickness in the range of 0.1 mm to 10 mm.

In the context of the present specification and claims, the term "laser cut substrate" relates to any substrate to which a laser beam has been applied so as to form at least one cut in the substrate by the laser beam. The laser beam may be emitted from any infra-red laser including a $CO_2$ laser, a YAG laser, a neodymium YLF laser, a neodymium-doped laser, a fiber laser, a pulsed laser, and a continuous laser.

In the context of the present specification and claims, the term "X % compression pressure" relates to the pressure applied to a square inch of a compressible material, such as foam, in order to compress that square inch of the compressible material by X %. For example, 10% compression pressure of a square inch of sponge is the pressure required to compress a square inch of the sponge by 10% of the sponge's initial thickness.

In the context of the present specification and claims, a treatment is considered to "not damage the substrate" or to "maintain substrate integrity", if, following the treatment, there are no additional marks, scratches, cuts, creases, curls, tears, rips, swells, or dents in the substrate that were formed by the treatment. Typically, the substrate, in untreated areas, remains unchanged or substantially unchanged. Typically the substrate, in treated areas, has no change or substantially no change other than that targeted by the treatment.

In the context of the present specification and claims, the term "resilient compressible material" relates to a material that is compressed when a particular pressure is applied to the material, such particular pressure releasing at least a portion of any liquid absorbed or adsorbed therein, and that returns substantially to its initial shape, or thickness, when such particular pressure is released.

In the context of the present specification and claims, the term "foam" relates to a resilient compressible material formed of rubber, the rubber including gas bubbles so as to form a cellular open pore structure.

In the context of the present specification and claims, the term "or" relates to an "inclusive or", and is equivalent to the term "at least one of A and B". As such, each of the phrase "A or B" and the phrase "at least one of A and B" includes the options "only A", "only B", and "A and B". Similarly, each of the phrase "A, B, or C" and the phrase "at least one of A, B, and C" includes the options "only A", "only B", "only C", "A and B", "B and C", "A and C", and "A, B, and C".

In the context of the present specification and claims, two terms or elements are "substantially alike", from a quantitative standpoint, if there is a deviation of at most 5% between the two terms or elements.

Reference is now made to FIGS. 1A and 1B, which are schematic sectional illustrations of a first embodiment of an inventive system 100 for cleaning HAZ from a broad surface of a paper substrate 101 according to an embodiment of the teachings herein.

As seen in FIGS. 1A and 1B, system 100 includes a cleaning element, which in the embodiment of FIGS. 1A and 1B is a cleaning roller 102, formed entirely of a resilient compressible material, preferably foam.

In some embodiments, the foam is selected from the group consisting of open rubber foam, reticulated foam, and felted foam. In some embodiments, the foam is formed of a material selected from the group of nitrile rubber, EPDM rubber, natural rubber, PVC, polyester, polyether, and polyurethane.

In some embodiments, the foam has a density in the range of 0.1 g/cm$^3$ to 0.4 g/cm$^3$, or 0.15 g/cm$^3$ to 0.30 g/cm$^3$.

In some embodiments, the foam has a 25% compression pressure in the range of 2 psi to 50 psi, 3 psi to 40 psi, or 5 psi to 30 psi. In some embodiments, the foam has a 65% compression pressure in the range of 15 psi to 80 psi, 20 psi to 75 psi, or 25 psi to 70 psi.

Examples of suitable foam materials include reticulated, fully open pore, permanently compressed polyurethane foam, such as types SIF 6-900Z, SIF 8-900Z, and SIF 12-900Z, commercially available from FXI Inc, of Media, PA, USA.

In some embodiments, cleaning roller 102 has a diameter in the range of 20 mm to 300 mm, or in the range of 40 mm to 100 mm.

Cleaning roller 102 is sized and configured to engage the entire width of the substrate in a single pass of the substrate against the cleaning roller, and as such, the length of the cleaning roller is at least equal to the width of the substrate. In some embodiments, cleaning roller 102 has a length in the range of 100 mm to 1500 mm, or in the range of 300 mm to 800 mm.

In some embodiments, a ratio between a diameter of cleaning roller 102 and a length of cleaning roller 102 is in the range of 1:3 to 1:20, or in the range of 1:5 to 1:20.

System 100 also includes a counter and/or support element, which, in the embodiment of FIGS. 1A and 1B, is a support roller 103. The paper substrate 101 is adapted to be supported by support roller 103, such that cleaning roller 102 is disposed vertically above paper substrate 101 and support roller 103.

In some embodiments, support roller 103 is formed of at least one of EPDM rubber, silicone rubber, polyurethane rubber, polyvinylchloride, and polymeric foam.

In some embodiments, support roller 103 has a diameter in the range of 20 mm to 300 mm, or in the range of 50 mm to 200 mm.

Support roller 103 is sized and configured to engage and support the entire width of the substrate, and as such, the length of the support roller is at least equal to the width of the substrate. In some embodiments, support roller 103 has a length in the range of 100 mm to 1500 mm, or in the range of 300 mm to 900 mm.

In some embodiments, a ratio between a diameter of support roller 103 and a length of support roller 103 is in the range of 1:3 to 1:20, or in the range of 1:5 to 1:20.

In some embodiments, a ratio between a diameter of cleaning roller 102 and a diameter of support roller 103 is in the range of 1:5 to 5:1, or in the range of 1:3 to 3:1.

In some embodiments, a ratio between a length of cleaning roller 102 and a length of support roller 103 is in the range of 1:1 to 1:10, or in the range of 1:1 to 1:2.

System 100 further includes a liquid source, which in the embodiment of FIGS. 1A and 1B is a pipe 105, in communication with a reservoir (not explicitly shown), arranged to provide liquid directly to cleaning roller 102. A squeezing roller 104 engages cleaning roller 102, downstream to the point at which pipe 105 provides liquid to the cleaning roller.

Squeezing roller 104 is adapted to rotate against cleaning roller 102 and to apply pressure thereto so as to remove at least some liquid therefrom.

In some embodiments, squeezing roller 104 is formed of aluminum, stainless steel, or plastic, which is preferably rigid plastic.

In some embodiments, squeezing roller 104 has a diameter in the range of 10 mm to 200 mm, or 20 mm to 80 mm. In some embodiments, squeezing roller 104 has a length in the range of 100 mm to 1500 mm, or in the range of 300 mm to 800 mm.

In some embodiments, a ratio between a diameter of squeezing roller 104 and a length of squeezing roller 104 is in the range of 1:3 to 1:20, or in the range of 1:5 to 1:20.

In some embodiments, a ratio between a diameter of cleaning roller 102 and a diameter of squeezing roller 104 is in the range of 1:1 to 10:1, or in the range of 2:1 to 5:1.

In some embodiments, a ratio between a length of cleaning roller 102 and a length of squeezing roller 104 is in the range of 1:1 to 1:10, or in the range of 1:1 to 1:1.5.

Figure 1C:
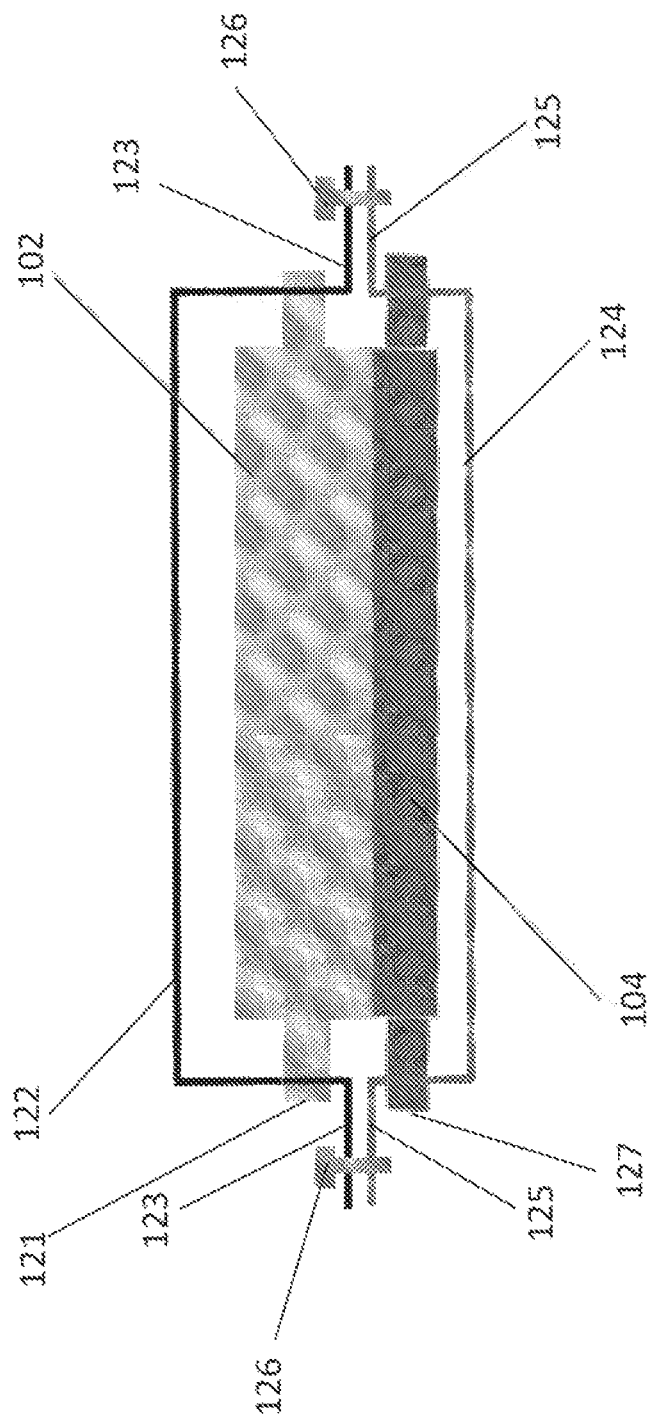
FIG. 1C is a schematic, top view planar illustration, of a frame forming part of the inventive system of FIGS. 1A and 1B.

Reference is additionally made to FIG. 1C, which is a schematic, top view planar illustration, of a frame forming part of system 100 (FIGS. 1A and 1B). As seen, axial ends 121 of cleaning roller 102 are supported by a first frame portion 122, such that the cleaning roller can rotate about its axis. First frame portion 122 terminates, at either end thereof, in a flange 123 disposed parallel to an axis of cleaning roller 102. Similarly, axial ends 127 of squeezing roller 104 are supported by a second frame portion 124, such that the squeezing roller can rotate about its axis. Second frame portion 124 terminates, at either end thereof, in a flange 125 disposed parallel to an axis of squeezing roller 104. A screw 126 connects flanges 123 and 125 at each end of the first and second frame portions, such that tightening of screws 126 increases the pressure applied by squeezing roller 104 onto cleaning roller 102, and loosening of screws 126 reduces the pressure applied by squeezing roller 104 onto cleaning roller 102.

Although FIG. 1C shows a specific mechanism for controlling the pressure applied by squeezing roller 104 to cleaning roller 102, any other suitable mechanism may be used. For example, the pressure may be controlled by an electronic controller determining the relative position of frame portions 122 and 124, a hydraulic system, or a pneumatic system.

A liquid collector 606, similar to liquid collector 106 of FIGS. 1A and 1B. is disposed adjacent cleaning roller 602 and downstream of an engagement point between squeezing roller 604 and cleaning roller 602.

As seen in FIG. 1A, in a resting mode of system 100, a gap 110 is present between cleaning roller 102 and support roller 103. Substrate 101 may or may not be disposed within the gap 110. Additionally, in the resting mode of system 100, rollers 102, 103, and 104 may be stationary.

As seen in FIG. 1B, in an operative mode of system 100, substrate 101 is disposed between support roller 103 and cleaning roller 102, such that a first broad surface of substrate 101 engages cleaning roller 102 and a second broad surface of the substrate engages support roller 103. In some embodiments, substrate 101 is fed into system 100 by a substrate-driving system (not explicitly shown), such that support roller 103 functions only to support the substrate during its passage through the system. In other embodiments, for example when substrate 101 is manually fed into gap 110, support roller 103 may function also as a driving roller, driving the substrate through gap 110 until the substrate is collected by an operator following cleaning thereof.

In other embodiments, support roller 103 and cleaning roller 102 may be permanently engaged. In such embodiments, in use, substrate 101 is supplied to a junction of rollers 102 and 103.

Substrate 101 may be any suitable substrate, including paper, paperboard, cardboard, laminated paper, and paper coated by a metallic layer.

Cleaning roller 102 rotates in a first, counterclockwise direction, indicated by arrow 112, while liquid is provided thereto from pipe 105, such that at least some of the liquid is absorbed in the foam of cleaning roller 102. In some embodiments, the remainder of the liquid, not absorbed in the foam of cleaning roller 102, is collected by a liquid collection and draining system described hereinbelow.

In some embodiments, pipe 105 provides the liquid to cleaning roller 102 at a fixed flow rate. In some embodiments, the fixed flow rate is in the range of 0.1 l/h to 10 l/h, 0.2 l/h to 8 l/h, or 0.3 l/h to 5 l/h.

In some embodiments, the liquid provided via pipe 105 is a hydrophilic liquid.

In some embodiments, the hydrophilic liquid is water.

In some embodiments, the hydrophilic liquid is an aqueous solution including at least one solute selected from the group consisting of a surfactant, a resin, a wetting agent, a detergent, a slip agent, an alcohol ether, and a ketone.

In some embodiments, the hydrophilic liquid contains at least 20%, at least 35%, or at least 50% ether, by weight.

In some embodiments, the hydrophilic liquid contains at least 20%, at least 35%, or at least 50% isopropyl-alcohol, by weight.

In some embodiments, the hydrophilic liquid may include at least one additive adapted to decrease or eliminate a smoke odor from the substrate.

In some embodiments, such as when the substrate is to be used in the food industry or the medical industry, the hydrophilic liquid may include at least one of a disinfecting additive, an antibacterial additive, an antifungal additive, or an antiviral additive.

Squeezing roller 104 rotates about a longitudinal axis thereof in a second, clockwise direction, opposed to the first direction and indicated by arrow 114. During rotation of squeezing roller 104, pressure is applied to the foam of cleaning roller 102, thereby removing at least part of the liquid absorbed or adsorbed in the foam of cleaning roller 102. The liquid removed from cleaning roller 102 is collected by liquid collector 106, and is removed from the system via liquid drain 108, from where it can be discarded, or recycled into pipe 105.

In some embodiment, rotation of squeezing roller 104 against cleaning roller 102 is adapted to compress the foam of cleaning roller 102 by 5% to 75%, by 30% to 75%, or by 65% of the foam thickness. In some embodiments, squeezing roller 104 applies a pressure in the range of 2 psi to 100 psi, or in the range of 10 psi to 70 psi to the foam of cleaning roller 102.

In some embodiments, squeezing roller 104 continuously applies pressure to cleaning roller 102.

In some embodiments, squeezing roller 104 periodically applies pressure to cleaning roller 102. In some such embodiments, squeezing roller 104 applies pressure to cleaning roller 102 at least once every 0.5 seconds, once every second, once every 2 seconds, once every 3 seconds, once every 5 seconds, or once every 10 seconds.

As described hereinabove, the substrate 101 is driven, or fed, into the space between cleaning roller 102 and support roller 103 by a dedicated substrate-driving system and/or by rotation of support roller 103. In some embodiments, the substrate has a linear speed in the range of 20 m/h to 10,000 m/h, 200 m/h to 10,000 m/h, 300 m/h to 9,000 m/h, 400 m/h to 7,000 m/h, or 500 m/h to 5,000 m/h.

In the embodiment of FIG. 1B, the paper substrate 101 is fed in the direction of arrow 115, at least in part by rotation of support roller 103 in a counterclockwise direction shown by arrow 116, such that the direction of rotation of support roller 103 is the same as the direction of rotation of cleaning roller 102. In this arrangement, the cleaning roller 102 rotates in an opposite direction to the direction in which the substrate is fed into the system 100.

As explained in further detail hereinbelow, in some embodiments the direction of motion of substrate 101 may be the same as the direction of the motion of a surface of cleaning roller 102 at a point of contact between the cleaning roller and the substrate.

In some embodiments, in which, at the point of contact between cleaning roller 102 and substrate 101, the cleaning roller and substrate move in opposite directions, a ratio of a linear speed of substrate 101 to a linear speed of cleaning roller 102 is in the range of 0.1 to 50, 0.25 to 40, 0.5 to 30, 0.75 to 20, or 1 to 10.

Due to the relative movement between the wetted cleaning roller 102 and substrate 101, a surface cleaning roller 102 having a suitable amount of liquid therein engages the first broad surface of substrate 101 such that a wet surface of cleaning roller 102 wipes the first broad surface of the substrate clean, without damaging the substrate.

In the illustrated embodiment, in which the substrate 101 and cleaning roller 102 are moving in opposite directions, the substrate 101 is always engaged by a portion of the cleaning roller 102 which has just been provided with liquid and had excess liquid and/or dirt removed therefrom by squeezing roller 104, such that cleaning roller has a clean and suitable wetted surface when engaging substrate 101, and does not introduce dirt or stains to the substrate.

In other embodiments, not specifically illustrated, the support roller 103 rotates in an opposite direction to the direction of rotation of cleaning roller 102, (for example, in the illustrated embodiment, support roller would rotate in a clockwise direction), such that the direction of motion of the substrate as it is fed into system 100 is the same as the direction of motion of the surface of cleaning roller 102 at the point of contact between the cleaning roller and the substrate. In such embodiments, in order for substrate 101 to always engage a clean portion of cleaning roller 102, cleaning roller 102 must move faster than substrate 101. In some such embodiments, the linear speed of cleaning roller 102 is greater than the linear speed of substrate 101 by at least 10%, at least 25%, at least 50%, at least 75%, or at least 100%, at least 200%, at least 300%, at least 400%, or at least 500%.

In some embodiments, system 100 further includes a drying mechanism 120, disposed downstream of cleaning roller 102. In the operative mode of system 100, following wetting and cleaning of substrate 101 by cleaning roller 102, the substrate is at least partially dried by the drying mechanism. In some embodiments, the drying mechanism is heat based. In some embodiments, the drying mechanism is airflow based.

Reference is now made to FIG. 2A, which is a schematic sectional illustration of a second embodiment of an inventive system 200 for cleaning HAZ from a paper substrate 101 according to another embodiment of the teachings herein. System 200 is illustrated in FIG. 2 in the resting mode, similar to the illustration in FIG. 1A, and has an operative mode as described hereinabove with respect to FIG. 1B.

System 200 is similar to system 100 of FIGS. 1A and 1B, with like numbers indicating like elements. System 200 differs from system 100 in that cleaning roller 102 of system 200 is not formed entirely of a resilient compressible material such as foam, but rather is formed of a foam layer 201, or layer of another resilient compressible material, surrounding a rigid core 202. As such, in operation of system 200, liquid provided from pipe 105 is absorbed only in foam layer 201, and only foam layer 201 is squeezed by squeezing roller 104.

In some embodiments, rigid core 202 is formed of at least one of aluminum, steel, and plastic. In some embodiments, rigid core 202 has a solid cross section, as illustrated, whereas in other embodiments the rigid core may be tubular, as shown in FIGS. 2B and 2C.

In some embodiments, rigid core 202 has a diameter in the range of 10 mm to 250 mm.

Foam layer 201 may be formed of materials as described hereinabove with respect to FIGS. 1A and 1B. In some embodiments, foam layer 201 has a thickness in the range of 1 mm to 50 mm, 2 mm to 40 mm, 3 mm to 30 mm, 3 mm to 20 mm, or 3 mm to 10 mm.

All other aspects of system 200 are similar to those described hereinabove with respect to FIGS. 1A and 1B, including component dimensions, operation parameters and characteristics, materials, liquids and the like.

Turning now to FIGS. 2B and 2C, it is seen that cleaning roller 102 may include a foam sleeve 204, formed of a tubular rigid core 202a, surrounded by a foam layer 201a. As seen in FIG. 2C, the core 202a may be slightly longer than the foam layer 201a. Foam sleeve 204 may be easily replaceable in the system 200, for example by placing the foam sleeve on a suitable shaft.

As seen in FIGS. 2D and 2E, the foam sleeve of FIGS. 2B and 2C may be formed by winding an elongate strip 206 of foam onto core 202a and adhering the wound foam to the core, so as are create foam layer 201a around core 202a.

Reference is now made to FIG. 3, which is a schematic side view illustration of a first arrangement of system 100 of FIGS. 1A and 1B, which facilitates refreshment of a cleaning liquid in the system. It is appreciated that the arrangement illustrated in FIG. 3 may be similarly applied to system 200 of FIG. 2.

As seen in FIG. 3, the longitudinal axes of cleaning roller 102, support roller 103, and squeezing roller 104 are all disposed at a slant relative to the horizontal, indicated by dashed line H, such that an acute angle α is formed between the longitudinal axis of each of rollers 102, 103, and 104, and the horizontal. In some embodiments, α is in the range of 0.1 to 10 degrees.

Pipe 305, similar to pipe 105 of FIGS. 1A and 1B, which provides the liquid to cleaning roller 102, is arranged at, or near, the highest point of cleaning roller 102.

Liquid collection bath 107 of liquid collector 106 is disposed substantially parallel to squeezing roller 104, such that a longitudinal axis of liquid collection bath 107 is also slanted relative to the horizontal by angle α. Liquid drain 108 is disposed at the lowest point of liquid collection bath 107.

In this arrangement, liquid provided by pipe 305 to cleaning roller 102, spreads along the length of the cleaning roller 102 by the force of gravity, such that the entire length of foam of roller 102 is wetted, and the liquid supply is refreshed throughout the length of the roller, thus assisting in or ensuring removal of dirty liquid from the roller. Additionally, excess liquid, which is not absorbed by cleaning roller 102, is collected by liquid collection bath 107, and flows within bath 107 to drain 108 under the force of gravity.

In some embodiments and arrangements, such as the embodiment and arrangement illustrated in FIG. 3, the support roller 103 and substrate 101 remain devoid of liquid dripping other than at an engagement region between substrate 101 and cleaning roller 102, while system 100 is devoid of sealing mechanisms.

In some embodiments, the squeezing roller 104 may be structured so as to assist in preventing undesirable dripping of liquid from cleaning roller 102 onto substrate 101 and support roller 103.

In the embodiment illustrated in FIG. 3, cleaning roller 102 terminates in ends 302. Squeezing roller 104 includes a first longitudinal portion 310, equal in length to cleaning roller 102 and extending along the entire length of cleaning roller 102. First longitudinal portion 310 has a first cross sectional diameter, perpendicular to a longitudinal axis of squeezing roller 104, indicated in FIG. 3 as D1. Squeezing roller 104 further includes second and third longitudinal portions 312a and 312b, extending on either longitudinal end of longitudinal portion 310. Longitudinal portion 312a has a second cross sectional diameter, perpendicular to a longitudinal axis of squeezing roller 104, indicated in FIG. 3 as D2, and third longitudinal portions 312b has a third cross sectional diameter, perpendicular to a longitudinal axis of squeezing roller 104, indicated in FIG. 3 as D3. Diameters D2 and D3 are smaller than diameter D1, such that shoulders 314a and 314b are formed between longitudinal portion 310, and each of longitudinal portions 312a and 312b, respectively. Diameters D2 and D3 may be equal to each other as illustrated, or may be different from each other. Shoulders 314a and 314b are flush with ends 302 of cleaning roller 102.

In use, liquid removed from cleaning roller 102 by squeezing roller 104, flows along the circumference of first portion 310 of the squeezing roller, and then drips along ends 302 of the cleaning roller 102 and shoulders 314a and 314b into liquid collector 106, without dripping onto support roller 103.

In other embodiments, not specifically illustrated, cleaning roller 102 terminates in ends 302 as illustrated. Squeezing roller 104 includes a pair of circumferential channels (not explicitly shown) at the ends of cleaning roller 102 and extending longitudinally away therefrom. The main portion of squeezing roller 104, including a longitudinal section thereof extending along the entire length of cleaning roller 102, has a first cross sectional diameter, perpendicular to a longitudinal axis of squeezing roller 104. The channels have a second diameter perpendicular to the longitudinal axis of squeezing roller 104, the second diameter being smaller than the first diameter. Shoulders defined by the channels and the central portion of squeezing roller 104 which extends along cleaning roller 102 are flush with the ends of cleaning roller 102.

In use, liquid removed from cleaning roller 102 by squeezing roller 104, flows along the circumference of the central portion 310 of the squeezing roller, and then drips along ends of the cleaning roller 102 into the channels, and from there into liquid collector 106, without dripping onto support roller 103.

Figure 4:
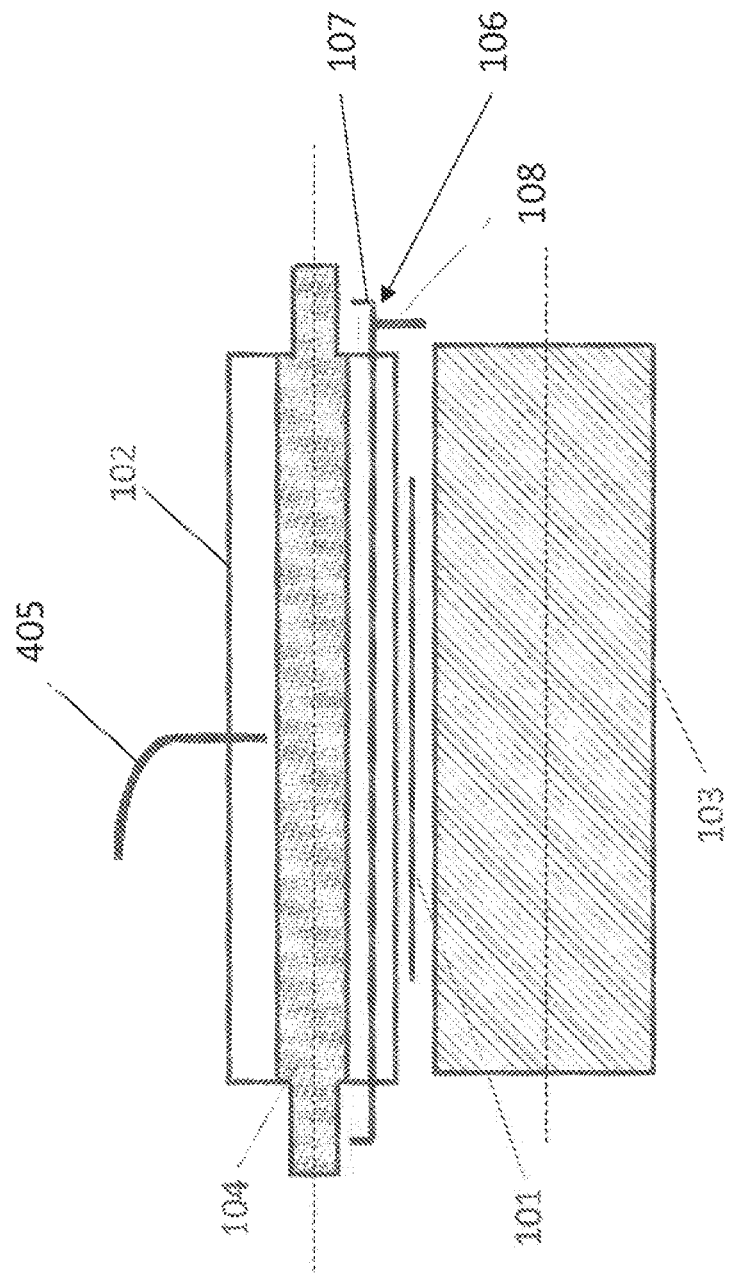
FIG. 4 is a schematic side view illustration of a second arrangement of the system of FIGS. 1A and 1B, which facilitates refreshment of a cleaning liquid in the system.

Reference is now made to FIG. 4, which is a schematic side view illustration of a second arrangement of system 100 of FIGS. 1A and 1B, which prevents undesired dripping of liquid on paper substrate 101 or on support roller 103. It is appreciated that the arrangement illustrated in FIG. 4 may be similarly applied to system 200 of FIG. 2.

As seen in FIG. 4, the longitudinal axes of cleaning roller 102, support roller 103, and squeezing roller 104 are all disposed substantially horizontally. Pipe 405, similar to pipe 105 of FIGS. 1A and 1B, which provides the liquid to cleaning roller 102, is arranged to provide liquid substantially at the center of cleaning roller 102, and is adapted to provide liquid at a sufficiently high pressure for the liquid to reach both ends of cleaning roller 102.

Liquid collection bath 107 of liquid collector 106 is disposed substantially parallel to squeezing roller 104, and liquid drain 108 is disposed at an end point of liquid collection bath 107.

In the embodiment of FIG. 4, squeezing roller 104 has a similar structure to that illustrated in FIG. 3, thereby preventing liquid from undesirable dripping onto substrate 101 and support roller 103, without sealing system 100.

Figure 5:
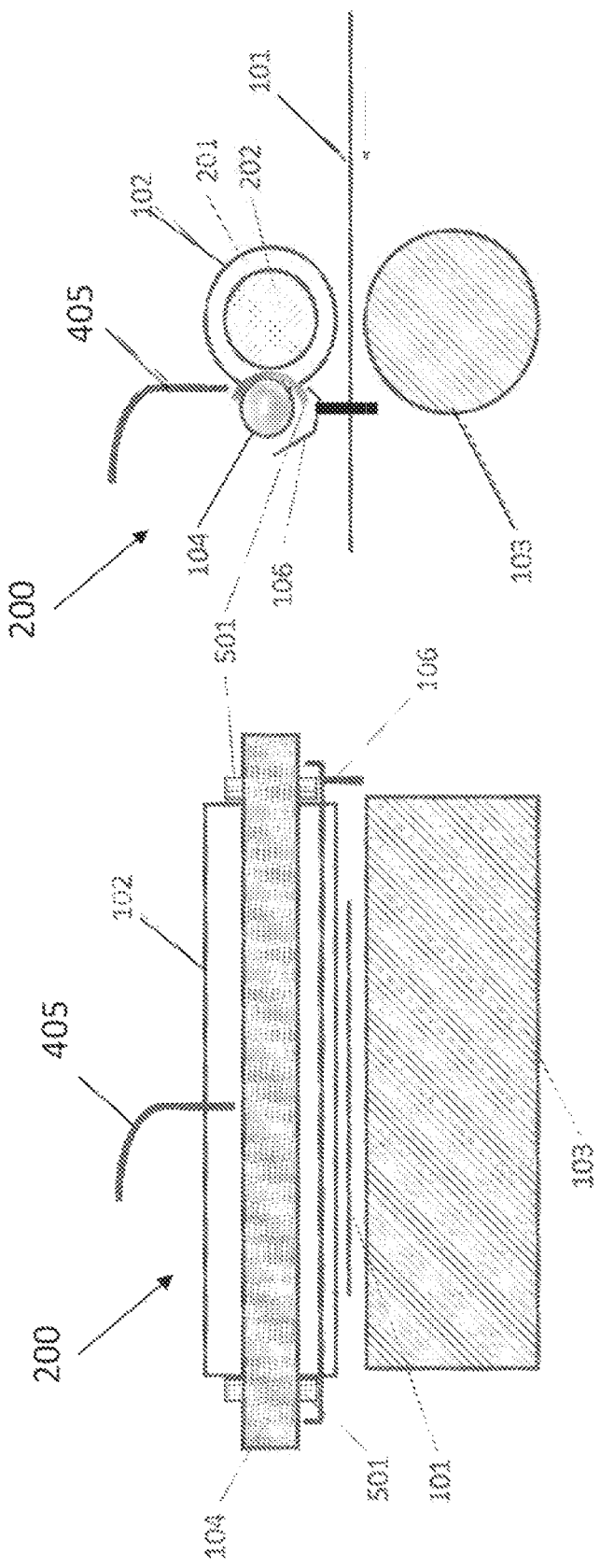
FIGS. 5A and 5B are, respectively, a schematic side view illustration and a schematic sectional illustration of a modification of the system of FIG. 2, which prevents undesired dripping of liquid on the paper substrate being cleaned.

Reference is now made to FIGS. 5A and 5B, which are, respectively, a schematic side view illustration and a schematic sectional illustration of a modification of the system 200 of FIG. 2, which prevents undesired dripping of liquid on paper substrate 101 and on support roller 103. It is appreciated that the arrangement illustrated in FIGS. 5A and 5B may be similarly applied to system 100 of FIGS. 1A and 1B.

System 200 as illustrated in FIGS. 5A and 5B is similar to the system illustrated in FIG. 4, in that cleaning roller 102, support roller 103, and squeezing roller 104 are arranged horizontally, pipe 405 provides liquid to the longitudinal center of cleaning roller 102, and liquid collection bath 107 is disposed beneath squeezing roller 104 with liquid drain 108 at one end of liquid collection bath 107.

A deflector 501, which may be formed of a curved metal leaf, is disposed adjacent squeezing roller 104 at each end of cleaning roller 102. Deflectors 501 extend towards, or into, liquid collection bath 107. In some embodiments, deflector 501 is formed of one or more of aluminum, copper, anodized aluminum, grained aluminum, ceramic-coated metals, or any other material having a surface energy higher than 500 Dynes/cm. In some embodiments, deflector 501 has a thickness in the range of 0.1 mm to 5 mm. In some embodiments, deflector 501 has a curvature having a greater radius than a radius of squeezing roller 104. In some embodiments, a ratio between the radius of the curvature of deflector 501 and the radius of squeezing roller 104 is in the range of 1.1 to 500, or in the range of 1.5 to 20.

In the operative mode of system 200 as illustrated in FIGS. 5A and 5B, liquid removed from cleaning roller 102 which drips beyond the ends of the cleaning roller is directed, by deflectors 501, into liquid collection bath 107 without dripping onto support roller 103.

Figure 6:
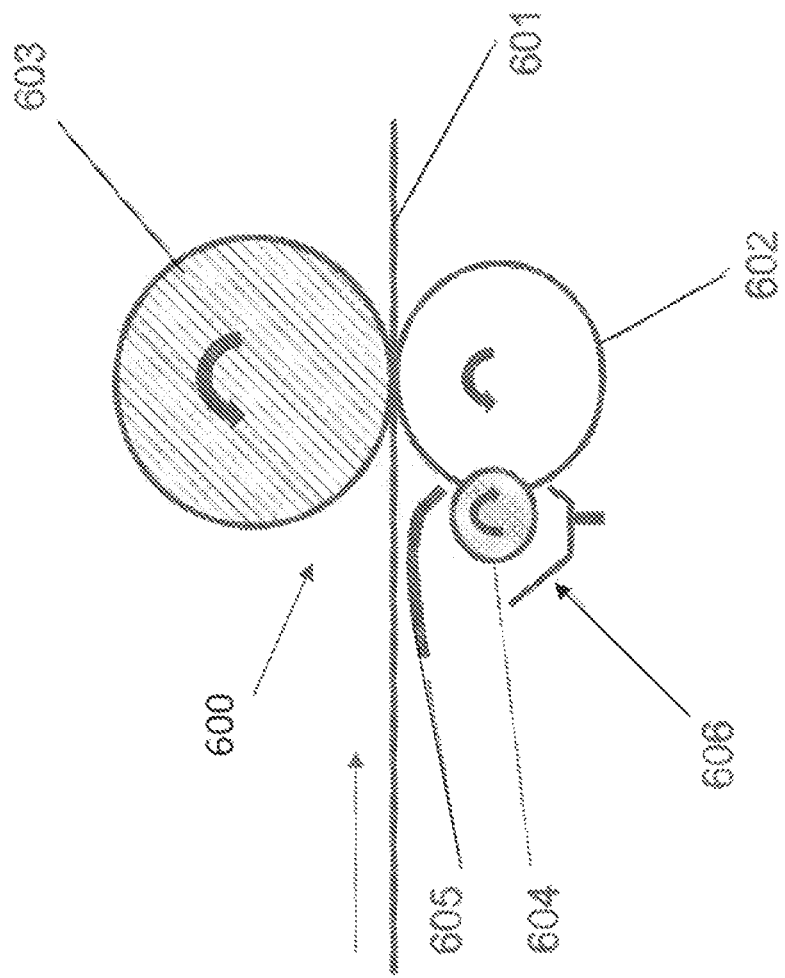
FIG. 6 is a schematic sectional illustration of a third embodiment of an inventive system for cleaning HAZ from a paper substrate according to an embodiment of the teachings herein.

Reference is now made to FIG. 6, which is a schematic sectional illustration of a third embodiment of an inventive system 600 for cleaning HAZ from a paper substrate 601 according to an embodiment of the teachings herein.

As seen in FIG. 6, system 600 includes a cleaning element, here illustrated as a cleaning roller 602, formed entirely of foam, substantially as described hereinabove with respect to cleaning roller 102 of FIGS. 1A and 1B.

System 600 also includes a counter and/or support element, here illustrated as a counter roller 603, which forms a counter to cleaning roller 602. The paper substrate 601 is adapted to be driven between cleaning roller 602 and counter roller 603, such that cleaning roller 602 is disposed vertically beneath paper substrate 601 and counter roller 603.

System 600 further includes a liquid source, which in the embodiment of FIG. 6 is a pipe 605, in communication with a reservoir (not explicitly shown), similar to pipe 105 of FIGS. 1A and 1B. Pipe 605 is arranged to provide liquid directly to cleaning roller 602. A squeezing roller 604, substantially similar to squeezing roller 104 of FIGS. 1A and 1B, engages cleaning roller 602, downstream to the point at which pipe 605 provides liquid to the cleaning roller. Squeezing roller 604 is adapted to apply pressure to cleaning roller 602 so as to remove at least some liquid therefrom. As illustrated in FIG. 6, squeezing roller 604 and pipe 605 are disposed beneath substrate 601 and counter roller 603.

Returning to FIGS. 1A and 1B, a liquid collector 106, including a liquid collection bath 107 and a liquid drain 108, is disposed adjacent cleaning roller 102 and downstream of an engagement point between squeezing roller 104 and cleaning roller 102.

System 600 functions in a similar manner to that of system 100 of FIGS. 1A and 1B. However, in system 600, the substrate is driven by a dedicated substrate driving system (not shown) or by rotation of cleaning roller 602, such that a lower broad surface of substrate 601 engages cleaning roller 602 and is cleaned thereby.

Figure 7:
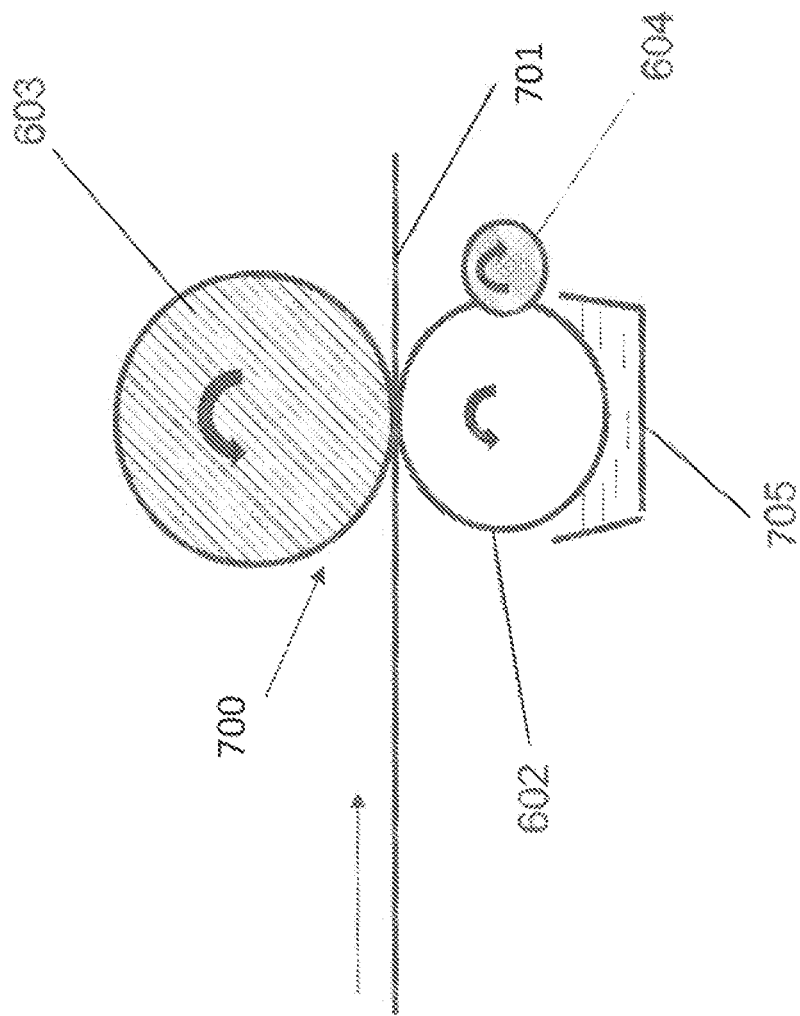
FIG. 7 is a schematic sectional illustration of a fourth embodiment of an inventive system for cleaning HAZ from a paper substrate, according to an embodiment of the teachings herein.

Reference is now made to FIG. 7 is a schematic sectional illustration of a fourth embodiment of an inventive system 700 for cleaning HAZ from a paper substrate 701 according to an embodiment of the teachings herein.

System 700 is similar to system 600 of FIG. 6, with like numbers indicating like elements. System 700 differs from system 600 in that the liquid source in system 700 is a liquid bath 705 containing the liquid used to clean the surface of substrate 701. The liquid bath 705 is disposed beneath cleaning roller 602, such that a portion of the foam of cleaning roller 602 is disposed within liquid bath 705 and absorbs liquid therefrom. In the operative mode of system 700, when cleaning roller 602 rotates, different portions of cleaning roller 602 pass through liquid bath 705 so as to provide liquid to the cleaning roller. Liquid bath 705 also functions as a liquid collector, such that liquid squeezed out of cleaning roller 602 by squeezing roller 604 return to liquid bath 705, and are reusable therein. In the embodiment of FIG. 7, counter roller 603 functions as a counter to cleaning roller 602, as described hereinabove with respect to FIG. 6.

All other aspects of system 700 are similar to those described hereinabove with respect to FIG. 6.

Figure 8:
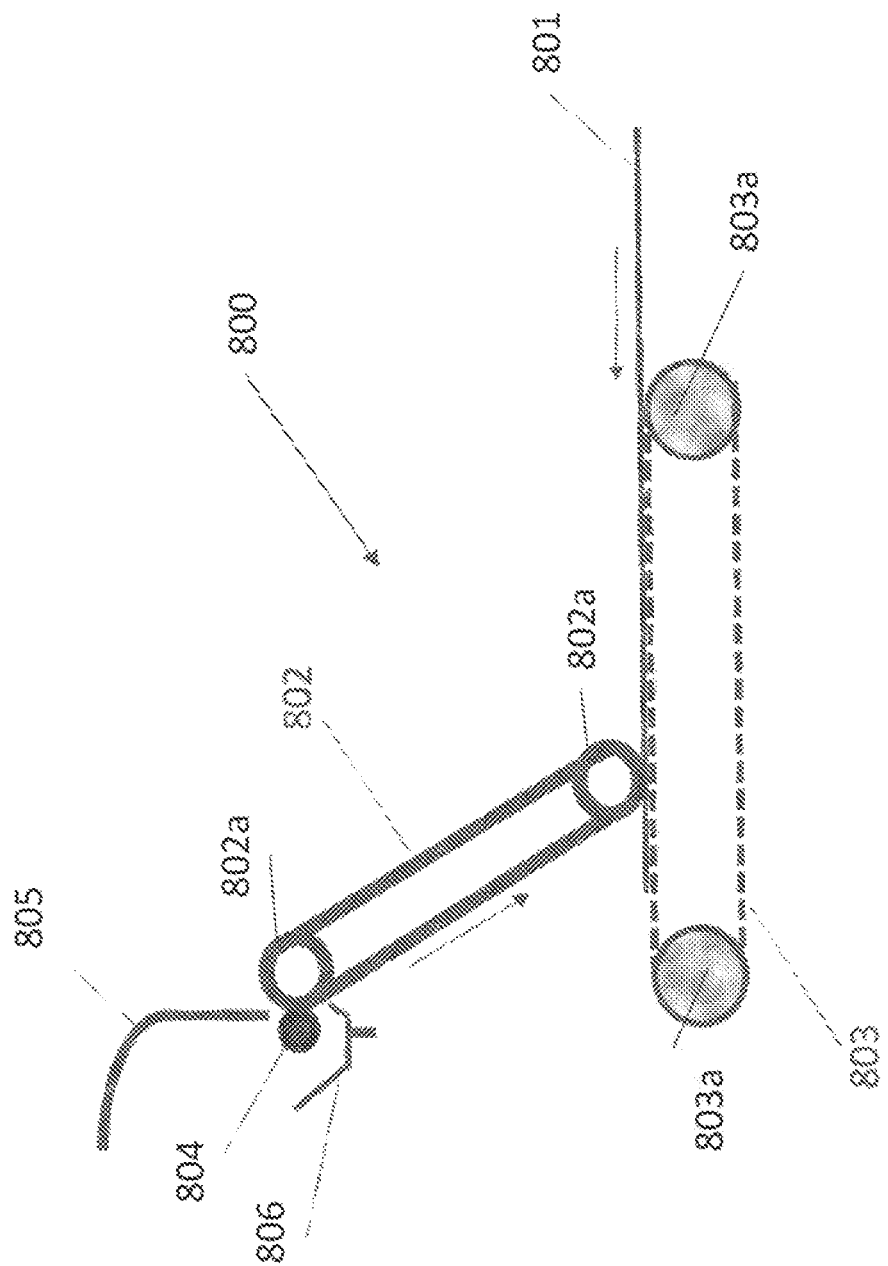
FIG. 8 is a schematic sectional illustration of a fifth embodiment of an inventive system for cleaning HAZ from a paper substrate, according to an embodiment of the teachings herein.

Reference is now made to FIG. 8, which is a schematic sectional illustration of a fifth embodiment of an inventive system 800 for cleaning HAZ from a paper substrate 801 according to an embodiment of the teachings herein.

As seen in FIG. 8, system 800 includes a cleaning element in the form of an endless cleaning belt 802, movable by at least two rollers 802a and 802b. Cleaning belt 802 includes a foam layer, which may, in some embodiments, be attached to, or disposed on, a support layer (not explicitly shown). In some embodiments, the support layer may be formed of any suitable material, such as textile, rubber, and metal.

In some embodiments, the foam layer of cleaning belt 802 has a thickness in the range of 1 mm to 50 mm, 2 mm to 40 mm, 3 mm to 30 mm, 3 mm to 20 mm, or 3 mm to 10 mm. The foam used to form the foam layer of cleaning belt 802 is similar to the foam used for cleaning roller 102 of FIGS. 1A and 1B, described hereinabove.

Cleaning belt 802 is sized and configured to engage the entire width of the substrate in a single pass of the substrate against the cleaning belt, and as such the width of the cleaning belt is at least equal to the width of the substrate. In some embodiments, cleaning belt 802 has a width in the range of 100 mm to 1500 mm.

In some embodiments, cleaning belt 802 has a length in the range of 200 mm to 3000 mm.

System 800 also includes a support and/or counter element in the form of an endless support belt 803, movable by at least two rollers 803a and 803b. The paper substrate 801 is adapted to be supported by support belt 803 and moved thereby, such that a portion of cleaning belt 802 is disposed above paper substrate 801 and support belt 803.

In the operative mode of system 800, cleaning belt 802 engages substrate 801 and support belt 803 at a point disposed between rollers 803a and 803b.

In some embodiments, belt 803 is support and driven by a third roller (not explicitly shown) which is disposed at, or adjacent, an engagement point between cleaning belt 802 and support belt 803.

Support belt 803 may engage substrate 801 and prevent relative movement between substrate 801 and belt 803 using any mechanism known in the art, such as application of vacuum through a plurality of vacuum ports in the support belt (not shown), or by forming support belt 803 from a material having high friction, such as rubber.

Support belt 803 is sized and configured to engage and support the entire width of the substrate, and as such, the width of the support belt is at least equal to the width of the substrate. In some embodiments, support belt 803 has a width in the range of 100 mm to 1500 mm.

In some embodiments, support belt 803 has a length in the range of 200 mm to 3000 mm.

System 800 further includes a liquid source, here illustrated as a pipe 805, similar to pipe 105 of FIGS. 1A and 1B, which is in communication with a reservoir (not explicitly shown), and is arranged to provide liquid directly to cleaning belt 802. A squeezing roller 804, similar to squeezing roller 104 of FIGS. 1A and 1B, engages cleaning belt 802, downstream to the point at which pipe 805 provides liquid to the cleaning belt. Squeezing roller 804 is adapted to apply pressure to cleaning belt 802 so as to remove at least some liquid therefrom.

A liquid collector 806, similar to liquid collector 106 of FIGS. 1A and 1B, is disposed adjacent cleaning belt 802 and downstream of an engagement point between squeezing roller 804 and cleaning belt 802.

System 800 functions substantially as described hereinabove with respect to FIGS. 1A and 1B, with belts 802 and 803 replacing rollers 102 and 103.

Figure 9:
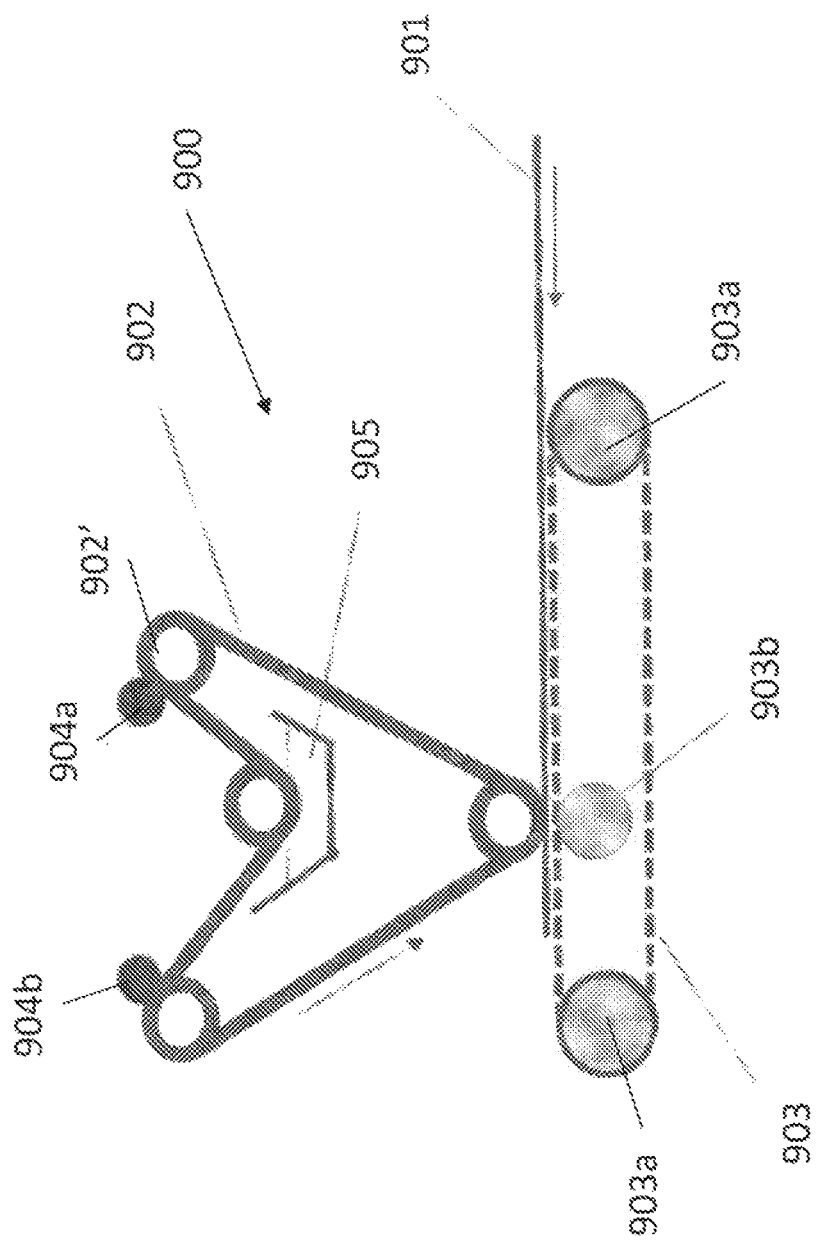
FIG. 9 is a schematic sectional illustration of a sixth embodiment of an inventive system for cleaning HAZ from a paper substrate, according to an embodiment of the teachings herein.

Reference is now made to FIG. 9, which is a schematic sectional illustration of a sixth embodiment of an inventive system 900 for cleaning HAZ from a paper substrate 901 according to an embodiment of the teachings herein.

System 900 is similar to system 800 of FIG. 8, with like numbers indicating like elements. System 900 differs from system 800 in that cleaning belt 902 of system 900, which is structured similarly to cleaning belt 802 of FIG. 8, is driven by a plurality of rollers 902'. Pipe 805 of FIG. 8 is replaced in system 900 by a liquid source in the form of a liquid bath 905, similar to liquid bath 705 described hereinabove with respect to FIG. 7. As seen in FIG. 9, rollers 902' may be arranged in any suitable configuration, such that the belt need not necessarily form a linear structure. Specifically, rollers 902' are arranged to form a concave shape, facilitating the passage of belt 902 through liquid bath 905 while being disposed above support belt 903, which is similar to support belt 803 of FIG. 8.

Additionally, system 900 includes a pair of squeezing rollers 904a and 904b. Squeezing roller 904a is arranged upstream to the belt 902 entering liquid bath 905, and is adapted to squeeze dirty or contaminated water out of the foam layer of belt 902. Squeezing roller 904 is disposed downstream to belt 902 entering liquid bath 905, and is adapted to squeeze excess liquid from the foam layer of belt 902 so as to prevent damage to the substrate. Liquid squeezed out of belt 902 returns to liquid bath 905 for further use thereof.

Support belt 903 is driven by a pair of rollers 903a similar to rollers 803a of FIG. 8, as well as by a third roller 903b disposed at, or adjacent, the point at which cleaning belt 902 engages substrate 901 and support belt 903.

All other aspects of system 900 are similar to those described hereinabove with respect to system 800 of FIG. 8, including the functionality thereof.

Reference is now made to FIG. 10, which is a schematic block diagram of a laser cutting system 10 including the inventive system of any one of FIGS. 1A to 9.

As seen, laser cutting system 10 includes a laser cutting station 12, adapted, in an operative mode of system 10, to direct an infrared laser at a first broad surface of a substrate so as to form at least one cut in the substrate. Laser cutting station 12 may be any suitable laser cutting station, such as, for example, Highcon EUCLID and BEAM laser cutting systems commercially available from Highcon Systems Ltd. of Yavne, Israel, or Packmaster CW and Lablemaster cutting machines commercially available from SEI Laser of Curno, Italy.

A substrate cleaning station 14, including a cleaning system according to any one of FIGS. 1A to 9, is disposed downstream of laser cutting station 12, and is adapted, in the operative mode of system 10, to receive the substrate following cutting thereof, and to apply liquid to the first broad surface of the substrate so as to clean the first broad surface without damaging the substrate.

System 10 may further include a substrate stacking station 16, such as a PrintStack, commercially available from Tameran (Ohio, USA). Stacking station 16 is disposed directly downstream of cleaning station 14. In the operative mode of system 10, substrate stacking station 16 is adapted to receive cleaned substrate directly from cleaning station 14 and to stack the received cleaned substrate in a stack of processed substrates, without previously drying the substrates.

Included hereinbelow are some embodiments of the present invention.

In accordance with an embodiment of the present invention, there is provided a system for cleaning a surface of a substrate, without damaging the substrate, the system including:

a cleaning element, including at least an outer layer formed of a resilient compressible material;

a liquid source adapted to provide liquid directly to the cleaning element;

at least one squeezing roller, engaging the cleaning element and applying pressure at least to the outer layer; and a counter element, adapted at least to counter the cleaning element, such that the substrate can be substantially stably disposed between the cleaning element and the counter element.

In some embodiments, in an operative mode of the system, the substrate is disposed between the counter element and the cleaning element such that a first broad surface of the substrate engages the cleaning element and a second broad surface of the substrate engages the counter element.

In some embodiments, in the operative mode, the cleaning element is adapted to rotate in a first direction while liquid is provided thereto by the liquid source, such that at least some of the provided liquid is absorbed in the resilient compressible material.

In some embodiments, in the operative mode, the squeezing roller is adapted to rotate about a longitudinal axis thereof in a second direction, opposed to the first direction, so as to apply pressure to the resilient compressible material of the cleaning element and to remove at least part of the absorbed liquid from the resilient compressible material.

In some embodiments, in the operative mode, while the substrate is driven between the cleaning element and the counter element and a surface of the resilient compressible material engages the first broad surface of the substrate, the first broad surface of the substrate is cleaned by the resilient compressible material.

In accordance with another embodiment of the present invention, there is provided a system for cleaning a surface of a substrate, without damaging the substrate, the system including:
- a cleaning element, including at least an outer layer formed of a resilient compressible material;
- a liquid source adapted to provide liquid directly to the cleaning element;
- at least one squeezing roller, engaging the cleaning element and applying pressure at least to the outer layer; and
- a counter element, adapted at least to counter the cleaning element, such that the substrate can be substantially stably disposed between the cleaning element and the counter element,
- wherein, in an operative mode of the system, the substrate is disposed between the counter element and the cleaning element such that a first broad surface of the substrate engages the cleaning element and a second broad surface of the substrate engages the counter element,
- wherein, in the operative mode, the cleaning element is adapted to rotate in a first direction while liquid is provided thereto by the liquid source, such that at least some of the provided liquid is absorbed in the resilient compressible material,
- wherein, in the operative mode, the squeezing roller is adapted to rotate about a longitudinal axis thereof in a second direction, opposed to the first direction, so as to apply pressure to the resilient compressible material of the cleaning element and to remove at least part of the absorbed liquid from the resilient compressible material, and
- wherein, in the operative mode, while the substrate is driven between the cleaning element and the counter element and a surface of the resilient compressible material engages the first broad surface of the substrate, the first broad surface of the substrate is cleaned by the resilient compressible material.

In some embodiments, in a resting mode, a gap is disposed between an outer surface of the cleaning element and an outer surface of the counter element.

In some embodiments, the counter element is adapted to support the substrate when the substrate moves between the cleaning element and the counter element.

In some embodiments, the flexible resilient material includes a foam material. In some embodiments, the foam material is selected from the group consisting of open rubber foam, reticulated foam, and felted foam. In some embodiments, the foam material is selected from the group of nitrile rubber, EPDM rubber, natural rubber, PVC, polyester, polyether, and polyurethane.

In some embodiments, the resilient compressible material has a density in the range of 0.1 g/cm3 to 0.4 g/cm3, or 0.15 g/cm3 to 0.30 g/cm3. In some embodiments, the resilient compressible material has a 25% compression pressure in the range of 2 psi to 50 psi, 3 psi to 40 psi, or 5 psi to 30 psi. In some embodiments, the resilient compressible material has a 65% compression pressure in the range of 15 psi to 80 psi, 20 psi to 75 psi, or 25 psi to 70 psi.

In some embodiments, in the operative mode, the substrate attains a linear speed in the range of 20 m/h to 10,000 m/h, 200 m/h to 10,000 m/h, 300 m/h to 9,000 m/h, 400 m/h to 7,000 m/h, or 500 m/h to 5,000 m/h.

In some embodiments, the system further includes a substrate driving system adapted to drive motion of the substrate through the system.

In some embodiments, the counter element is adapted to rotate and to drive motion of the substrate through the system.

In some embodiments, the counter element is adapted to rotate and to drive motion the substrate in the second direction, opposed to the first direction. In some such embodiments, a ratio of a linear speed of the substrate to a linear speed of the cleaning element is in the range of 0.1 to 50, 0.25 to 40, 0.5 to 30, 0.75 to 20, or 1 to 10.

In some embodiments, the counter element is adapted to rotate and to drive motion the substrate in the first direction. In some such embodiments, a linear speed of the cleaning element is greater than a linear speed of the substrate by at least 10%, at least 25%, at least 50%, at least 75%, at least 100%, at least 200%, at least 300%, at least 400%, or at least 500%.

In some embodiments, the liquid is a hydrophilic liquid. In some embodiments, the hydrophilic liquid is water. In some embodiments, the hydrophilic liquid is a water based solution including at least one solute selected from the group consisting of a surfactant, a resin, a wetting agent, a detergent, a slip agent, an alcohol ether, and a ketone.

In some embodiments, the hydrophilic liquid contains at least 20%, at least 35%, or at least 50% ether, by weight.

In some embodiments, the hydrophilic liquid contains at least 20%, at least 35%, or at least 50% isopropyl-alcohol, by weight.

In some embodiments, the hydrophilic liquid includes at least one additive adapted to decrease or eliminate a smoke odor from the substrate. In some embodiments, the hydrophilic liquid includes at least one of a disinfecting additive, an antibacterial additive, an antifungal additive, or an antiviral additive.

In some embodiments, the at least one squeezing roller has a diameter in the range of 10 mm to 200 mm, or 20 mm to 80 mm. In some embodiments, the at least one squeezing roller has a length in the range of 100 mm to 1500 mm or in the range of 300 mm to 800 mm. In some embodiments, a ratio between a diameter of the at least one squeezing roller and a length of the at least one squeezing roller is in the range of 1:3 to 1:20 or in the range of 1:5 to 1:20.

In some embodiments, the at least one squeezing roller is formed of a material selected from the group consisting of aluminum, stainless steel, and plastic.

In some embodiments, in the operative mode, the at least one squeezing roller is adapted to continuously apply pressure to the resilient compressible material of the cleaning element.

In some embodiments, in the operative mode, the at least one squeezing roller is adapted to periodically apply pressure to the resilient compressible material of the cleaning element. In some embodiments, the squeezing roller is adapted to apply pressure to the resilient compressible material at least once every 0.5 seconds, once every second, once every 2 seconds, once every 3 seconds, once every 5 seconds, or once every 10 seconds.

In some embodiments, rotation of the at least one squeezing roller against the cleaning element is adapted to compress the resilient compressible material of the cleaning element by 5% to 75%, or by 30% to 75%, of a thickness of the resilient compressible material.

In some embodiments, rotation of the at least one squeezing roller against the cleaning element is effected so as to compress the resilient compressible material of the cleaning element by 65% of a thickness of the resilient compressible material.

In some embodiments, the at least one squeezing roller is adapted to apply to the resilient compressible material of the cleaning element a pressure in the range of 2 psi to 100 psi or in the range of 10 psi to 70 psi.

In some embodiments, the cleaning element includes a cleaning roller, adapted to rotate in the first direction about a longitudinal axis thereof.

In some embodiments, the cleaning roller includes a rigid core surrounded by the outer layer of the resilient compressible material. In some embodiments, the outer layer has a thickness in the range of 1 mm to 50 mm, 2 mm to 40 mm, 3 mm to 30 mm, 3 mm to 20 mm, or 3 mm to 10 mm. In some embodiments, the rigid core has a diameter in the range of 10 mm to 250 mm.

In some embodiments, the rigid core is cylindrical, and has a solid circular cross section.

In some embodiments, the rigid core is tubular.

In some embodiments, the cleaning roller is formed entirely of the resilient compressible material.

In some embodiments, the cleaning roller has a diameter in the range of 20 mm to 300 mm, or in the range of 40 mm to 100 mm. In some embodiments, the cleaning roller has a length at least equal to a width of the substrate. In some embodiments, the cleaning roller has a width in the range of 100 mm to 1500 mm or in the range of 300 mm to 800 mm. In some embodiments, a ratio between a diameter of the cleaning roller and a length of the cleaning roller is in the range of 1:3 to 1:20 or in the range of 1:5 to 1:20.

In some embodiments, a ratio between a diameter of the cleaning roller and a diameter of the at least one squeezing roller is in the range of 1:1 to 10:1, or in the range of 2:1 to 5:1. In some embodiments, a ratio between a length of the cleaning roller and a length of the at least one squeezing roller is in the range of 1:1 to 1:10 or in the range of 1:1 to 1:1.5.

In some embodiments, the cleaning element includes an endless cleaning belt adapted to be moved and rotated by at least two rollers, and, in the operative mode, to engage the substrate and the counter element adjacent one of the at least two rollers.

In some embodiments, the outer layer of the cleaning belt is disposed onto a support layer. In some embodiments, the support layer is formed a material selected from the group of textile, rubber, and metal.

In some embodiments, the outer layer of resilient compressible material has a thickness in the range of 1 mm to 50 mm, 2 mm to 40 mm, 3 mm to 30 mm, 3 mm to 20 mm, or 3 mm to 10 mm.

In some embodiments, the cleaning belt has a width at least equal to a width of the substrate. In some embodiments, the cleaning belt has a width in the range of 100 mm to 1500 mm. In some embodiments, the cleaning belt has a length in the range of 200 mm to 3000 mm.

In some embodiments, the counter element includes a counter roller, adapted to rotate about a longitudinal axis thereof. In some embodiments, the counter roller is formed of a material selected from the group consisting of EPDM rubber, silicone rubber, polyurethane rubber, polyvinylchloride, and polymeric foam.

In some embodiments, the counter roller has a diameter in the range of 20 mm to 300 mm. In some embodiments, a length of the counter roller is at least equal to a width of the substrate. In some embodiments, the counter roller has a length in the range of 100 mm to 1500 mm or in the range of 300 mm to 800 mm. In some embodiments, a ratio between a diameter of the counter roller and a length of the counter roller is in the range of 1:3 to 1:20 or in the range of 1:5 to 1:20.

In some embodiments, the cleaning element includes a cleaning roller, and wherein a ratio between a diameter of the cleaning roller and a diameter of the counter roller is in the range of 1:5 to 5:1 or in the range of 1:3 to 3:1. In some embodiments, a ratio between a length of the cleaning roller and a length of the counter roller is in the range of 1:1 to 1:10 or in the range of 1:1 to 1:2.

In some embodiments, the counter element includes an endless counter belt adapted to be moved and rotated by at least two rollers, and, in the operative mode, to engage the substrate and the cleaning element between the at least two rollers.

In some embodiments, the endless counter belt is adapted to be moved and rotated by three rollers, a first and a second roller disposed at extreme positions of the endless belt, and a third roller disposed adjacent an engagement point with the cleaning element.

In some embodiments, the endless counter belt includes a plurality of vacuum ports, and is adapted to apply vacuum suction, through the plurality of vacuum ports, to the substrate so as to prevent the substrate from moving relative to the endless counter belt.

In some embodiments, the endless counter belt is a rubber belt adapted to prevent the substrate from moving relative to the endless counter belt by friction between the endless counter belt and the substrate.

In some embodiments, a width of the endless counter belt is at least equal to a width of the substrate. In some embodiments, the endless counter belt has a width in the range of 100 mm to 1500 mm. In some embodiments, the endless counter belt has a length in the range of 200 mm to 3000 mm.

In some embodiments, the cleaning element is disposed vertically above the counter element, and the counter element is adapted to support the substrate during operation of the system.

In some embodiments, the cleaning element is disposed vertically beneath the counter element.

In some embodiments, the liquid source includes a liquid reservoir and a pipe in fluid communication with the liquid reservoir, the pipe terminating in an outlet disposed adjacent the cleaning element, and wherein in the operative mode the outlet adapted to provide the liquid to the cleaning element.

In some embodiments, the liquid source includes a faucet having an outlet disposed adjacent the cleaning element, and wherein in the operative mode the faucet is adapted to provide the liquid to the cleaning element.

In some embodiments, an engagement point between the at least one squeezing roller and the cleaning element is disposed downstream, in the first direction, from the outlet of the liquid source, such that the at least one squeezing roller engages the cleaning element and removes the at least part of the absorbed liquid following provision of the liquid to the cleaning element and absorption of the liquid by the resilient compressible material.

In some embodiments, the outlet is adapted to provide the liquid to the cleaning element at a fixed flow rate. In some embodiments, the fixed flow rate is in the range of 0.1 l/h to 10 l/h, 0.2 l/h to 8 l/h, or 0.3 l/h to 5 l/h.

In some embodiments, the liquid source includes a liquid bath containing the liquid, disposed beneath the cleaning element such that a portion of the resilient flexible material is disposed within the liquid bath, and wherein in the operative mode, when the cleaning element rotates in the first direction, different portions of the cleaning element pass through the liquid bath so as to provide the liquid thereto.

In some embodiments, an engagement point between the at least one squeezing roller and the cleaning element is disposed downstream, in the first direction, from the liquid bath, such that the at least one squeezing roller engages the cleaning element and removes the at least part of the absorbed liquid from a portion of the resilient flexible material following the portion of the resilient flexible material being disposed in the liquid bath and absorbing liquid therefrom.

In some embodiments, the system further includes a liquid collector, including a liquid collection bath and a liquid drain, the liquid collector being disposed adjacent the cleaning element and downstream of an engagement point between the at least one squeezing roller and the cleaning element in the first direction, the liquid collector adapted, in the operative mode, to collect liquid removed from the cleaning element by the at least one squeezing roller and to drain the collected liquid from the system.

In some embodiments, the system further includes a drain, the drain being disposed adjacent the cleaning element and downstream of an engagement point between the at least one squeezing roller and the cleaning element in the first direction, the drain adapted, in the operative mode, to drain liquid removed from the cleaning element by the at least one squeezing roller.

In some embodiments, the liquid removed from the cleaning element by the at least one squeezing roller includes excess liquid absorbed by the resilient flexible material.

In some embodiments, the liquid removed from the cleaning element by the at least one squeezing roller includes liquid that has been dirtied by cleaning the substrate at an earlier pass thereover.

In some embodiments, in the operative mode, the portion of the cleaning element engaging the substrate is sufficiently clean so as not to spread dirt on the substrate.

In some embodiments, the cleaning element includes a cleaning roller, and a longitudinal axis of the cleaning roller and a longitudinal axis of the at least one squeezing roller are disposed at an angle relative to the horizontal, a nozzle of the liquid source provides the liquid to the cleaning element at or near a highest point of the cleaning element, the liquid collection bath extends along the longitudinal axis of the squeezing roller beneath the at least one squeezing roller and at the angle relative to the horizontal, and the liquid drain is disposed at a lowest point of the liquid collection bath, such that the liquid spreads along the length of the cleaning element, and collected liquid arrives at the liquid drain, under the force of gravity. In some embodiments, the angle is in the range of 0.1 to 10 degrees.

In some embodiments, the cleaning element includes a cleaning roller, and a longitudinal axis of the cleaning roller and a longitudinal axis of the at least one squeezing roller are disposed horizontally, a nozzle of the liquid source provides the liquid to the cleaning element at or near a center point of the longitudinal axis of the cleaning element, the liquid collection bath extends horizontally along the longitudinal axis of the at least one squeezing roller beneath the at least one squeezing roller, and the liquid drain is disposed at a longitudinal end point of the liquid collection bath adjacent one longitudinal end of the cleaning roller, such that the liquid spreads along the length of the cleaning element by a force of the liquid stream provided from the nozzle.

In some embodiments, in the operative mode, the counter element and the substrate remain devoid of liquid dripping other than at an engagement region of the cleaning element and the substrate, without sealing the system.

In some embodiments, the cleaning element includes a longitudinally extending cleaning roller, the at least one squeezing roller includes a first longitudinal portion, extending along an entire length of the cleaning roller and equal in length thereto, and second and third longitudinal portions, extending on either longitudinal end of the first longitudinal portion, the first longitudinal portion having a first diameter perpendicular to a longitudinal axis of the at least one squeezing roller, and the second and third longitudinal portions having a second diameter perpendicular to the longitudinal axis of the at least one squeezing roller, the second diameter being smaller than the first diameter such that a shoulder is formed between the first longitudinal portion and each of the second and third longitudinal portions, the shoulder being flush with an end of the cleaning roller, and in the operative mode, liquid removed from the cleaning roller drips along the shoulders and into the liquid collector without dripping onto the counter element.

In some embodiments, the cleaning element includes a longitudinally extending cleaning roller, the at least one squeezing roller includes a pair of channels, disposed at either end of the cleaning roller and extending longitudinally away therefrom, the at least one squeezing roller having a first diameter perpendicular to a longitudinal axis thereof, and the channels having a second diameter perpendicular to the longitudinal axis of the at least one squeezing roller, the second diameter being smaller than the first diameter, such that shoulders defined by the channels and the remainder of the at least one squeezing roller are flush with the ends of the cleaning roller, and in the operative mode, liquid removed from the cleaning roller is collected in the channels and drips therefrom into the liquid collector without dripping onto the counter element.

In some embodiments, the cleaning element includes a longitudinally extending cleaning roller, a deflector is disposed adjacent the at least one squeezing roller at either end of the cleaning roller, the deflector extending towards the liquid collection bath, and in the operative mode, liquid removed from the cleaning roller which drips beyond ends of the cleaning roller is directed by the deflector into the liquid collection bath without dripping onto the counter element. In some embodiments, the deflector includes a curved leaf.

In some embodiments, the deflector is formed of a material selected from the group consisting of aluminum, copper, anodized aluminum, grained aluminum, and ceramic coated metals. In some embodiments, the deflector is formed of a material having a surface energy higher than 500 Dynes/cm.

In some embodiments, the deflector has a thickness in the range of 0.1 mm to 5 mm. In some embodiments, the deflector has a curvature having a greater radius than a radius of the at least one squeezing roller. In some embodiments, a ratio between a radius of a curvature of the deflector and a radius of the at least one squeezing roller is in the range of 1.1 to 500 or in the range of 1.5 to 20.

In some embodiments, the substrate includes at least one of paper, paperboard, cardboard, laminated paper, embossed paper, paper having creasing lines and paper coated by a metallic layer. In some embodiments, the substrate includes a multilayer substrate including at least one paper layer.

In some embodiments, the system further includes a drying mechanism, disposed downstream along the counter element and of the cleaning element, and wherein in the operative mode the drying mechanism is adapted to dry the substrate following cleaning thereof by the cleaning element. In some embodiments, the drying mechanism is heat based. In some embodiments, the drying mechanism is air-flow based.

In accordance with a further embodiment of the present invention, there is provided a system for creating a laser cut substrate, the system including:
 a laser cutting station, adapted, in an operative mode of the system, to direct a infrared laser at a first broad surface of a substrate so as to form at least one cut in the substrate; and
 a cleaning station including a cleaning system as disclosed hereinabove, disposed downstream of the laser cutting station, and adapted, in the operative mode, to receive the substrate including the at least one cut and to engage the first broad surface of the substrate so as to clean the first broad surface.

In some embodiments, the system further includes a substrate stacking station disposed directly downstream of the cleaning station, wherein, in the operative mode, the substrate stacking station is adapted to receive the cleaned substrate directly from the cleaning station and to stack the received cleaned substrate in a stack of processed substrates, and wherein the system is devoid of a drying mechanism.

In accordance with another embodiment of the present invention, there is provided a method for cleaning a first broad surface of a substrate, the substrate having first and second broad surfaces, without damaging the substrate, using the system as disclosed hereinabove, the method including:
 providing liquid to the cleaning element such that at least some of the provided liquid is absorbed in the resilient compressible material;
 rotating the cleaning element a first direction;
 during the rotating of the cleaning element, applying to the resilient compressible material of the cleaning element by rotating the squeezing roller about a longitudinal axis thereof in a second direction, opposed to the first direction, so as to remove at least part of the absorbed liquid from the resilient compressible material; and
 driving the substrate between the cleaning element and the counter element, such that a surface of the resilient compressible material engages the first broad surface of the substrate, so as to clean the first broad surface of the substrate.

In accordance with a further embodiment of the present invention, there is provided a method for cleaning a first broad surface of a substrate, the substrate having first and second broad surfaces, without damaging the substrate, the method including:
 providing liquid from a liquid source directly to a cleaning element, the cleaning element including at least an outer layer formed of a resilient compressible material, such that at least some of the provided liquid is absorbed in the resilient compressible material;
 rotating the cleaning element in a first direction;
 during the rotating the cleaning element, applying pressure to the resilient compressible material of the cleaning element to remove at least part of the absorbed liquid from the resilient compressible material; and
 during the rotating of the cleaning element, driving the substrate such that a surface of the resilient compressible material engages the first broad surface of the substrate, so as to clean the first broad surface of the substrate.

In some embodiments, applying pressure includes rotating at least one squeezing roller, engaging the cleaning element, in a second direction opposed to the first direction, so as to apply the pressure to the resilient compressible material.

In some embodiments, driving the substrate includes driving the substrate between the cleaning element and a counter element, such that the first broad surface of the substrate engages the cleaning element and the second broad surface of the substrate engages the counter element.

In some embodiments, driving the substrate includes driving the substrate to attain a linear speed in the range of 20 m/h to 10,000 m/h, 200 m/h to 10,000 m/h, 300 m/h to 9,000 m/h, 400 m/h to 7,000 m/h, or 500 m/h to 5,000 m/h.

In some embodiments, driving the substrate includes utilizing a substrate driving system to drive the substrate.

In some embodiments, driving the substrate includes rotating the counter element so as to drive the substrate.

In some embodiments, rotating the counter element includes rotating the counter element in a second direction, opposed to the first direction. In some embodiments, during the rotating of the cleaning element and driving of the substrate, a ratio of a linear speed of the substrate to a linear speed of the cleaning element is in the range of 0.1 to 50, 0.25 to 40, 0.5 to 30, 0.75 to 20, or 1 to 10.

In some embodiments, rotating the counter element includes rotating the counter element in the first direction. In some embodiments, during the rotating of the cleaning element and driving of the substrate, a linear speed of the cleaning element is greater than a linear speed of the substrate by at least 10%, at least 25%, at least 50%, at least 75%, at least 100%, at least 200%, at least 300%, at least 400%, or at least 500%.

In some embodiments, providing the liquid includes providing a hydrophilic liquid. In some embodiments, the hydrophilic liquid is water. In some embodiments, the hydrophilic liquid is a water based solution including at least one solute selected from the group consisting of a surfactant, a resin, a wetting agent, a detergent, a slip agent, an alcohol ether, and a ketone.

In some embodiments, the hydrophilic liquid contains at least 20%, at least 35%, or at least 50% ether, by weight.

In some embodiments, the hydrophilic liquid contains at least 20%, at least 35%, or at least 50% isopropyl-alcohol, by weight.

In some embodiments, the hydrophilic liquid includes at least one additive adapted to decrease or eliminate a smoke odor from the substrate. In some embodiments, the hydrophilic liquid includes at least one of a disinfecting additive, an antibacterial additive, an antifungal additive, or an antiviral additive.

In some embodiments, applying pressure includes continuously applying pressure to the resilient compressible material of the cleaning element.

In some embodiments, applying pressure comprises periodically applying pressure to the resilient compressible material of the cleaning element. In some embodiments, periodically applying pressure includes applying pressure to the resilient compressible material at least once every 0.5 seconds, once every second, once every 2 seconds, once every 3 seconds, once every 5 seconds, or once every 10 seconds.

In some embodiments, applying pressure includes compressing the resilient compressible material of the cleaning element by 5% to 75%, by 30% to 75%, or by 65% of a thickness of the resilient compressible material. In some embodiments, applying pressure includes applying to the resilient compressible material of the cleaning element a pressure in the range of 2 psi to 100 psi or in the range of 10 psi to 70 psi.

In some embodiments, providing liquid includes providing the liquid from a liquid reservoir via a pipe terminating in an outlet disposed adjacent the cleaning element. In some embodiments, providing liquid comprises providing the liquid from a faucet having an outlet disposed adjacent the cleaning element.

In some embodiments, providing liquid includes providing the liquid, from the outlet, at a fixed flow rate. In some embodiments, the fixed flow rate is in the range of 0.1 l/h to 10 l/h, 0.2 l/h to 8 l/h, or 0.3 l/h to 5 l/h.

In some embodiments, providing liquid includes disposing a portion of the resilient flexible material in a liquid bath containing the liquid, such that during the rotating of the cleaning element, different portions of the cleaning element pass through the liquid bath.

In some embodiments, the method further includes draining liquid removed from the cleaning element by the pressure applied to the cleaning element.

In some embodiments, the method further includes, prior to the draining, collecting the liquid removed from the cleaning element in a liquid collector disposed adjacent the cleaning element and downstream of an engagement point between the at least one squeezing roller and the cleaning element in the first direction.

In some embodiments, the substrate includes at least one of paper, paperboard, cardboard, laminated paper, embossed paper, paper having creasing lines and paper coated by a metallic layer. In some embodiments, the substrate includes a multilayer substrate including at least one paper layer.

In some embodiments, the method further includes drying the substrate following cleaning thereof by the cleaning element.

In accordance with yet another embodiment of the present invention, there is provided a method for creating a laser cut substrate, the method including:
directing a infrared laser at a first broad surface of a substrate so as to form at least one cut in the substrate;
following the directing the infrared laser, cleaning the first broad surface of the substrate using the method disclosed herein.

In some embodiments, the method further includes, following the cleaning, stacking the cleaned substrate in a stack of processed substrates without previously drying the cleaned substrate.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for cleaning a surface of a substrate, without damaging the substrate, the system comprising:
   a substrate comprising at least one of paper, paperboard, cardboard, laminated paper, embossed paper, and paper having creasing lines;
   a cleaning element, comprising at least an outer layer formed of a resilient compressible material and a rigid core;
   a liquid source adapted to provide liquid directly to said cleaning element;
   at least one squeezing roller, engaging said cleaning element and applying pressure at least to said outer layer; and
   a counter element, adapted at least to counter said cleaning element, such that said substrate can be substantially stably disposed between said cleaning element and said counter element,
   wherein, in an operative mode of said system, said substrate is disposed between said counter element and said cleaning element such that a first broad surface of said substrate engages said cleaning element and a second broad surface of said substrate engages said counter element,
   wherein, in said operative mode, said cleaning element is adapted to rotate in a first direction while liquid is provided thereto by said liquid source, such that at least some of said provided liquid is absorbed in said resilient compressible material,
   wherein, in said operative mode, said squeezing roller is adapted to rotate about a longitudinal axis thereof in a second direction, opposed to said first direction, so as to apply pressure to said resilient compressible material of said cleaning element and to remove at least part of said absorbed liquid from said resilient compressible material, and
   wherein, in said operative mode, while said substrate is driven between said cleaning element and said counter element and a surface of said resilient compressible material engages said first broad surface of said substrate, said first broad surface of said substrate is cleaned by said resilient compressible material.

2. The system of claim 1, wherein said resilient compressible material comprises a foam material.

3. The system of claim 2, wherein said foam material is selected from the group consisting of open rubber foam, reticulated foam, and felted foam.

4. The system of claim 1, wherein said counter element is adapted to rotate and to drive motion of said substrate through said system.

5. The system of claim 1, wherein said counter element is adapted to rotate and to drive motion said substrate in said first direction.

6. The system of claim 1, wherein said liquid is a hydrophilic liquid.

7. The system of claim 1, wherein, in said operative mode, said at least one squeezing roller is adapted to apply pressure to said resilient compressible material of said cleaning element.

8. The system of claim 1, wherein, during rotation thereof against said cleaning element, said at least one squeezing roller is adapted to compress said resilient compressible material of said cleaning element by 5% to 75%, by 30% to 75%, or by 65% of a thickness of said resilient compressible material.

9. The system of claim 1, wherein said counter element comprises an endless counter belt adapted to be moved and rotated by at least two rollers, and, in said operative mode, to engage said substrate and said cleaning element between said at least two rollers.

10. The system of claim 1, wherein said liquid source comprises a liquid reservoir and a pipe in fluid communication with said liquid reservoir, said pipe terminating in an outlet disposed adjacent said cleaning element, and wherein in said operative mode said outlet is adapted to provide said liquid to said cleaning element.

11. The system of claim 10, wherein an engagement point between said at least one squeezing roller and said cleaning element is disposed downstream, in said first direction, from said outlet of said liquid source, such that said at least one squeezing roller engages said cleaning element and removes said at least part of said absorbed liquid following provision of the liquid to the cleaning element and absorption of the liquid by said resilient compressible material.

12. The system of claim 1, wherein said liquid source comprises a faucet having an outlet disposed adjacent said cleaning element, and wherein in said operative mode said faucet is adapted to provide said liquid to said cleaning element.

13. The system of claim 1, wherein said liquid source comprises a liquid bath containing said liquid, disposed beneath said cleaning element such that a portion of said resilient compressible material is disposed within said liquid bath, and wherein in said operative mode, with said cleaning element rotating in said first direction, different portions of said cleaning element pass through said liquid bath so as to provide said liquid thereto.

14. The system of claim 1, further comprising a liquid collector, including a liquid collection bath and a liquid drain, said liquid collector being disposed adjacent said cleaning element and downstream of an engagement point between said at least one squeezing roller and said cleaning element in said first direction, said liquid collector adapted, in said operative mode, to collect liquid removed from said cleaning element by said at least one squeezing roller and to drain said collected liquid from said system.

15. The system of claim 14, wherein said liquid removed from said cleaning element by said at least one squeezing roller comprises liquid that has been dirtied by cleaning said substrate at an earlier pass thereover.

16. The system of claim 14, wherein:
said cleaning element comprises a cleaning roller, and wherein a longitudinal axis of said cleaning roller and a longitudinal axis of said at least one squeezing roller are disposed at an angle relative to the horizontal,
a nozzle of said liquid source provides said liquid to said cleaning element at or near a highest point of said cleaning element,
said liquid collection bath extends along said longitudinal axis of said squeezing roller beneath said at least one squeezing roller and at said angle relative to the horizontal, and
said liquid drain is disposed at a lowest point of said liquid collection bath,
such that said liquid spreads along the length of said cleaning element, and collected liquid arrives at said liquid drain, under the force of gravity.

17. The system of claim 14, wherein:
said cleaning element comprises a cleaning roller, and wherein a longitudinal axis of said cleaning roller and a longitudinal axis of said at least one squeezing roller are disposed horizontally,
a nozzle of said liquid source provides said liquid to said cleaning element at or near a center point of said longitudinal axis of said cleaning element,
said liquid collection bath extends horizontally along said longitudinal axis of said at least one squeezing roller beneath said at least one squeezing roller, and
said liquid drain is disposed at a longitudinal end point of said liquid collection bath adjacent one longitudinal end of said cleaning roller,
such that said liquid spreads along the length of said cleaning element by a force of the liquid stream provided from said nozzle.

18. The system of claim 1, wherein, in said operative mode, the portion of said cleaning element engaging said substrate is clean so as not to spread dirt on said substrate.

19. The system of claim 18, wherein:
said cleaning element comprises a cleaning roller, and wherein a longitudinal axis of said cleaning roller and a longitudinal axis of said at least one squeezing roller are disposed at an angle relative to the horizontal,
a nozzle of said liquid source provides said liquid to said cleaning element at or near a highest point of said cleaning element,
said liquid collection bath extends along said longitudinal axis of said squeezing roller beneath said at least one squeezing roller and at said angle relative to the horizontal, and
said liquid drain is disposed at a lowest point of said liquid collection bath, such that said liquid spreads along the length of said cleaning element, and collected liquid arrives at said liquid drain, under the force of gravity.

20. The system of claim 18, wherein:
said cleaning element comprises a cleaning roller, and wherein a longitudinal axis of said cleaning roller and a longitudinal axis of said at least one squeezing roller are disposed horizontally,
a nozzle of said liquid source provides said liquid to said cleaning element at or near a center point of said longitudinal axis of said cleaning element,
said liquid collection bath extends horizontally along said longitudinal axis of said at least one squeezing roller beneath said at least one squeezing roller, and
said liquid drain is disposed at a longitudinal end point of said liquid collection bath adjacent one longitudinal end of said cleaning roller,
such that said liquid spreads along the length of said cleaning element by a force of the liquid stream provided from said nozzle.

21. The system of claim 1, further comprising a dryer, disposed downstream along said counter element and of said cleaning element, and wherein, in said operative mode, said dryer is adapted to dry said substrate following cleaning thereof by said cleaning element.

22. A system for creating a laser cut substrate, the system comprising:

a laser cutting station, adapted, in an operative mode of said system, to direct a laser at a first broad surface of a substrate so as to form at least one cut in said substrate; and a cleaning station including a cleaning system according to claim 1, disposed downstream of said laser cutting station, and adapted, in said operative mode, to receive said substrate including said at least one cut, and to engage said first broad surface of said substrate so as to clean said first broad surface and remove residue and burn marks generated by said laser without damaging said substrate.

23. A method for cleaning a first broad surface of a laser-cut substrate having first and second broad surfaces, without damaging the substrate, using the system of claim 1, the method comprising:

providing liquid to said cleaning element such that at least some of the provided liquid is absorbed in said resilient compressible material;

rotating said cleaning element a first direction;

during said rotating of said cleaning element, applying to said resilient compressible material of said cleaning element by rotating said squeezing roller about a longitudinal axis thereof in a second direction, opposed to said first direction, so as to remove at least part of said absorbed liquid from said resilient compressible material; and driving the laser-cut substrate between said cleaning element and said counter element, such that a surface of said resilient compressible material engages the first broad surface of the laser-cut substrate, so as to clean residue and burn marks formed by laser cutting off of the first broad surface of said laser-cut substrate.

24. The system of claim 1, wherein said resilient compressible material of said cleaning element is squeezed between said squeezing roller and said rigid core of said cleaning element so as to remove said at least part of said absorbed liquid from said resilient compressible material.

\* \* \* \* \*